United States Patent
Kroeger et al.

(10) Patent No.: US 10,871,578 B2
(45) Date of Patent: Dec. 22, 2020

(54) DIFFERENTIAL CORRECTION MAP FOR GNSS

(71) Applicant: iBiquity Digital Corporation, Calabasas, CA (US)

(72) Inventors: Brian Kroeger, Calabasas, CA (US); Paul J. Peyla, Calabasas, CA (US); Steven L. Teig, Calabasas, CA (US)

(73) Assignee: iBiquity Digital Corporation, Columbia, MD (US)

( * ) Notice: Subject to any disclaimer, the term of this patent is extended or adjusted under 35 U.S.C. 154(b) by 141 days.

(21) Appl. No.: 16/184,440

(22) Filed: Nov. 8, 2018

(65) Prior Publication Data
US 2020/0025937 A1   Jan. 23, 2020

Related U.S. Application Data

(60) Provisional application No. 62/688,260, filed on Jun. 21, 2018.

(51) Int. Cl.
G01S 19/41 (2010.01)
G01S 19/07 (2010.01)

(52) U.S. Cl.
CPC .............. *G01S 19/41* (2013.01); *G01S 19/07* (2013.01); *G01S 19/071* (2019.08); *G01S 19/073* (2019.08)

(58) Field of Classification Search
CPC ........ G01S 5/009; G01S 19/07; G01S 19/071; G01S 19/073; G01S 19/41
See application file for complete search history.

(56) References Cited

U.S. PATENT DOCUMENTS

| 5,323,322 A | 6/1994 | Muller et al. |
| 2002/0198657 A1 | 12/2002 | Robbins |
| 2005/0131640 A1 | 6/2005 | Price et al. |
| 2007/0085734 A1 | 4/2007 | Whitehead et al. |
| 2011/0187593 A1 | 8/2011 | Gaal et al. |
| 2011/0231061 A1 | 9/2011 | Reeve et al. |
| 2012/0127032 A1 | 5/2012 | McClure |

OTHER PUBLICATIONS

International Search Report and Written Opinion in corresponding International Patent Application No. PCT/US2018/059819, dated Jan. 28, 2019.
Namie, H., et al., "Developmet of Network-Based RTK-GPS Positioning System Using FKP Via a TV Broadcast in Japan," IEEE Transactions on Broadcasting, vol. 54(1), pp. 106-111 (Mar. 2008).
International Search Report in corresponding International Patent Application No. PCT/US2018/059819, dated Jan. 28, 2019.

*Primary Examiner* — Dao L Phan
(74) *Attorney, Agent, or Firm* — Edell, Shapiro & Finnan, LLC; Craig S. Fischer

(57) ABSTRACT

A method comprises generating for a Global Navigation Satellite System (GNSS) a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations.

31 Claims, 18 Drawing Sheets

POLYNOMIAL / PROXIMITY AVERAGE

| DCM FOR PROXIMITY-WEIGHTED INTERPOLATION (6 VIRTUAL DGPSR STATIONS) | | | | | | | | | | | | | | |
|---|---|---|---|---|---|---|---|---|---|---|---|---|---|---|
| DCM ID | | | | | | | | | | | | | | |
| GPS TIME | | | | | | | | | | | | | | |
| V0 LAT/LONG | | | | | | | | | | | | | | |
| SAT ID | dT (L1) | | | | | | dT (L2) | | | | | | MISC. | |
| | V0 | V1 | V2 | V3 | V4 | V5 | V0 | V1 | V2 | V3 | V4 | V5 | | |
| 0 | | | | | | | | | | | | | | |
| 1 | | | | | | | | | | | | | | |
| 2 | | | | | | | | | | | | | | |
| 3 | | | | | | | | | | | | | | |
| 4 | | | | | | | | | | | | | | |
| 5 | | | | | | | | | | | | | | |
| 6 | | | | | | | | | | | | | | |
| 7 | | | | | | | | | | | | | | |
| 8 | | | | | | | | | | | | | | |
| 9 | | | | | | | | | | | | | | |
| 10 | | | | | | | | | | | | | | |
| 11 | | | | | | | | | | | | | | |
| 12 | | | | | | | | | | | | | | |
| 13 | | | | | | | | | | | | | | |
| 14 | | | | | | | | | | | | | | |
| 15 | | | | | | | | | | | | | | |
| 16 | | | | | | | | | | | | | | |
| 17 | | | | | | | | | | | | | | |
| 18 | | | | | | | | | | | | | | |
| 19 | | | | | | | | | | | | | | |

FIG.9

| DCM FOR POLYNOMIAL INTERPOLATION (6 VIRTUAL DGPSR STATIONS) | | | | | | | | | | | | | |
|---|---|---|---|---|---|---|---|---|---|---|---|---|---|
| DCM ID | | | | | | | | | | | | | |
| GPS TIME | | | | | | | | | | | | | |
| V0 LAT/LONG | | | | | | | | | | | | | |
| SAT ID | POLYNOMIAL COEFFICIENTS (L1) | | | | | | POLYNOMIAL COEFFICIENTS (L2) | | | | | | MISC. |
| | A | B | C | D | E | F | A | B | C | D | E | F | |
| 0 | | | | | | | | | | | | | |
| 1 | | | | | | | | | | | | | |
| 2 | | | | | | | | | | | | | |
| 3 | | | | | | | | | | | | | |
| 4 | | | | | | | | | | | | | |
| 5 | | | | | | | | | | | | | |
| 6 | | | | | | | | | | | | | |
| 7 | | | | | | | | | | | | | |
| 8 | | | | | | | | | | | | | |
| 9 | | | | | | | | | | | | | |
| 10 | | | | | | | | | | | | | |
| 11 | | | | | | | | | | | | | |
| 12 | | | | | | | | | | | | | |
| 13 | | | | | | | | | | | | | |
| 14 | | | | | | | | | | | | | |
| 15 | | | | | | | | | | | | | |
| 16 | | | | | | | | | | | | | |
| 17 | | | | | | | | | | | | | |
| 18 | | | | | | | | | | | | | |
| 19 | | | | | | | | | | | | | |

FIG.10

DIFFERENTIAL CORRECTION MAP FOR GNSS

PRIORITY CLAIM

This application claims priority to U.S. Provisional Application No. 62/688,260, filed Jun. 21, 2018, which is incorporated herein by reference in its entirety.

TECHNICAL FIELD

The present disclosure relates to differential corrections for Global Navigation Satellite Systems (GNSSs).

BACKGROUND

In a conventional networked Differential Global Positioning System (GPS) (DGPS) service, a mobile platform or rover determines its GPS location and reports the GPS location to the DGPS service. The DGPS service computes a differential correction for a single virtual reference station at the GPS location, based on information from actual physical reference stations. The DGPS service transmits the differential correction based on the single virtual reference station back to the rover, which uses the differential correction to correct the GPS location. The networked DGPS service disadvantageously requires continuous two-way communications with the rover. Such two-way communications may not be available at all times and locations (coverage area), and a user of the rover is likely to incur a subscription cost (either directly or indirectly). There is also a potential privacy issue since the DGPS service learns the location of the rover each time the rover reports its location.

BRIEF DESCRIPTION OF THE DRAWINGS

FIG. 9 is an illustration of an example DCM Type 0 for proximity-weighted interpolation based on the VRSC of FIG. 4.

FIG. 10 is an illustration of an example DCM Type 1 based on a polynomial fit for the VRSC of FIG. 4.

DESCRIPTION OF EXAMPLE EMBODIMENTS

Example Embodiments

Introduction

Figure 1:
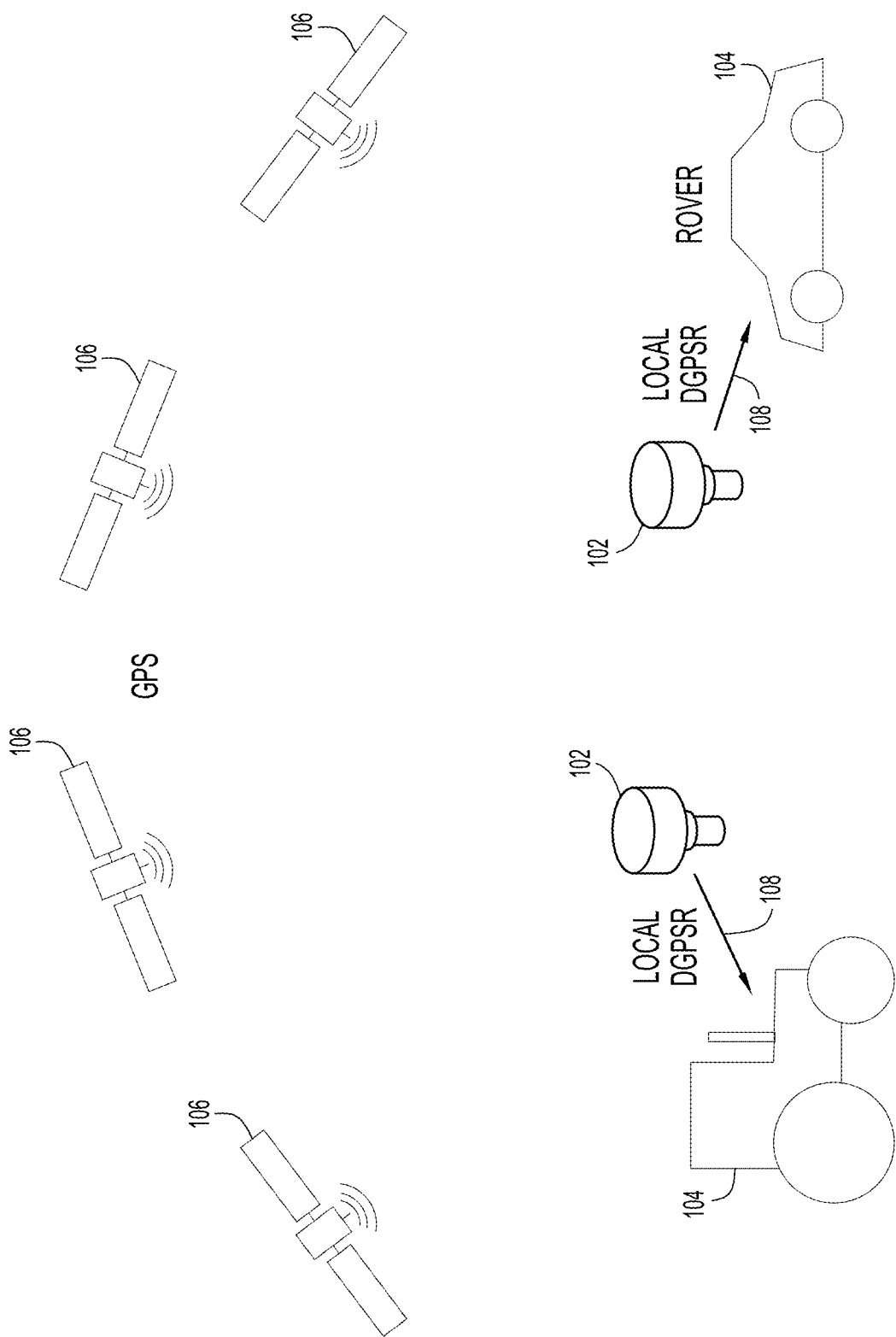
FIG. 1 is an illustration of an example environment in which local DGPS reference (DGPSR) stations correct GPS errors to achieve precision GPS measurements at local vehicles or rovers.

Global Navigation Satellite Systems (GNSSs) have become crucial components of the quickly-evolving autonomous vehicle navigation technology. The location accuracy of ubiquitous consumer-grade Global Positioning System (GPS) receivers is typically within about 3 meters when 4 or more GPS satellites are in line of sight (LOS). This accuracy is generally sufficient for most vehicle navigation where a GPS-enabled device is used to provide directions to assist a human driver. In this case, the human driver is able to perform the vehicle operations that require finer location precision, such as staying in the lane or parking. However, autonomous vehicle navigation requires greater location precision provided by a combination of devices including GPS. Redundancy is needed since the vehicle sensors are not each reliable all of the time. For example, the vehicle's GPS antenna may be shadowed from the satellites by buildings or terrain, and multipath signal reflections could cause errors in GPS measurements. Improvements in accuracy beyond that of typical consumer-grade GPS devices require a variety of techniques to yield GPS location accuracy within about 10 cm in LOS conditions, sufficient for autonomous vehicle navigation.

A GPS receiver measures the relative time delays of the signals from multiple GPS satellites to compute its location, time, and velocity. The errors in these time-delay measurements are due to multiple factors. The GPS signals from the satellites are subject to satellite clock and ephemeris (orbit trajectory) errors. The LOS signals arriving at the GPS receiver antenna experience errors due to ionosphere and troposphere signal propagation (index of refraction variations). The GPS receiver incurs measurement errors due to imprecise signal processing algorithms as well as unwanted signal reflections from objects. Redundant devices such as Inertial Navigation Systems (INS), image processing, radar and sonar are used to aid local navigation and estimate location when the GPS signals are not available or faulty (multipath reflections).

The GPS measurement accuracy over single frequency (L1) consumer-grade GPS devices can be improved by a combination of techniques. Dual frequency (L1 and L2) GPS receivers offer greater inherent measurement accuracy due to the availability of more GPS satellite signals. Real-Time-Kinematic (RTK) techniques use not only the demodulated GPS pseudo-noise (PN) signal for relative time measurements, but also use the carrier frequency cycles for much finer resolution. These receiver processing improvements alone would not yield their inherent accuracy potential unless the other errors of the GPS signal are also corrected. This is accomplished with a class of techniques called Differential GPS (DGPS), where a precision GPS receiver accepts a DGPS correction input (e.g., in Radio Technical Commission for Maritime Services (RTCM) format).

DGPS Reference Station

DGPS techniques provide auxiliary error correction information to the GPS receiver. This error (differential) correction information about the local GPS signals includes ephemeris and clock errors from each satellite in view, as well as error correction for local ionosphere and troposphere propagation. The simplest method of providing DGPS correction data is accomplished by measuring the differential error at a local DGPS reference (DGPSR) station. The DGPSR station is an actual, physical DGPSR station, also referred to as an installed DGPSR station.

FIG. 1 shows an environment in which local DGPSR stations 102 (referred to collectively as DGPSR stations 102 and individually as a DGPSR station 102) correct GPS errors to achieve precision GPS measurements at local rovers or vehicles 104 (referred to collectively as rovers/vehicles 104 and individually as a rover/vehicle 104). Accuracy of the GPS measurements may be on the order of several centimeters (cm). Each DGPSR station 102 can be positioned at a precisely known (e.g., surveyed) location. The DGPSR station 102 measures its location as determined by GPS satellite signals from GPS satellites 106. Each DGPSR station 102 computes the differential time error from its known location relative to its GPS-measured location. This differential error is converted to equivalent differential range corrections, or pseudorange corrections (PRC), for each of the satellites 106 in view. These differential corrections are sent via another radio channel 108 to the local vehicle/rover 104 to correct position calculations performed by a GPS receiver carried on the rover. The error drift rate of the PRC, or Range Rate Correction (RRC), may also be conveyed so the PRC can be appropriately corrected for a short time after the PRC is measured. The term "rover" or "rover platform" is construed broadly to include any vehicle, platform, or device, whether fixed or mobile, whether land-based, airborne, or seaborne. A rover or rover platform may include, but is not limited to, a car, truck, tractor, train, airplane, ship, autonomous vehicle, fixed structure (e.g., tower or building), computer system, and the like.

The DGPSR station corrections require frequent updates (e.g., at least once a minute) due to changes in the differential error values over time. Higher update rates (e.g., once per second) and other techniques may be needed to maintain greater RTK accuracy. The accuracy also degrades with distance from the DGPSR station location, maintaining high accuracy over a limited range (e.g., up to 10 km). The local DGPSR station 102 is useful for applications such as farming where autonomous farm vehicles can operate over a limited area. Temporary DGPSR stations are also useful for surveying.

Networked DGPS

Figure 2:
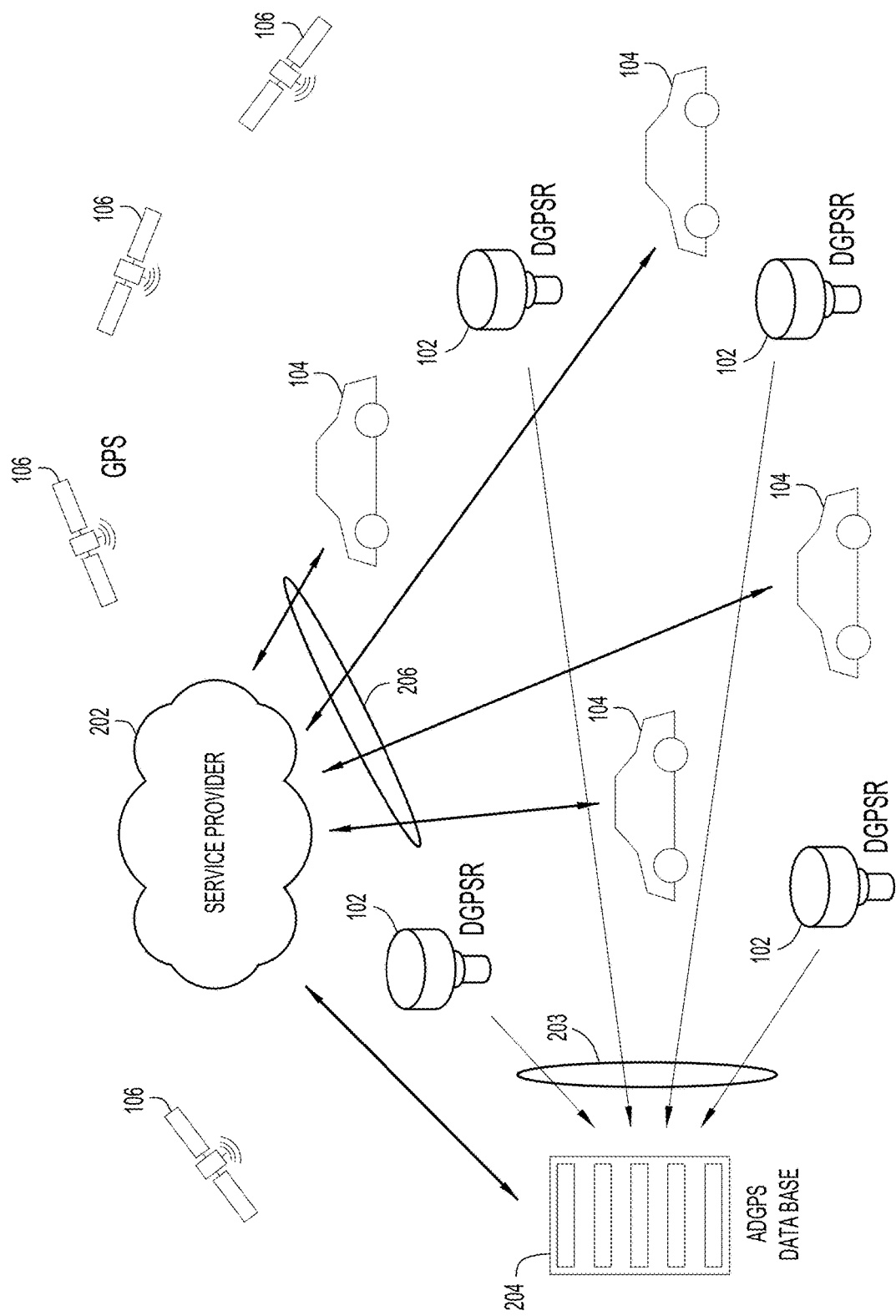
FIG. 2 is an illustration of an example environment for networked DGPS applications covering a wide area.

FIG. 2 is an illustration of an environment for DGPS applications covering a wide area (e.g., North America). The environment of FIG. 2 uses a network subscription service orchestrated at a DGPS service provider 202. In FIG. 2, DGPSR stations 102 spanning the world are networked to feed differential corrections 203 into an Aggregated DGPS (ADGPS) database (DB) 204 that offers wide-area or even global DGPS correction data. Since the DGPSR stations 102 are not sufficiently close-spaced over most of the potential coverage areas, interpolation and other methods are used to cover most regions. These evolving services might be offered to users (e.g., rovers 104) for a subscription fee for each device.

DGPS service provider 202 retrieves from ADGPS database 204 global DGPS correction data, including clock and ephemeris errors, and differential corrections 203. DGPGS service provider 202 conveys, via 2-way communication links 206, differential corrections derived from the global DGPS correction data retrieved from the ADGPS database 204 to a wireless modem and DGPS processor connected to a GPS receiver on each rover 104. The rover 104 maintains 2-way contact with the DGPS service provider 202 via the 2-way communication links to obtain frequent DGPS updates (i.e., differential correction updates). For example, the rover 104 first sends to the DGPS service provider 202 its (i.e., the rover's) approximate location as measured by the rover's GPS receiver. The DGPS service provider 202 then computes the differential corrections specifically for the rover's location, and then sends the computed differential corrections to the rover. The differential corrections include differential corrections for each of the satellites 106 potentially in view at the rover's location. This may include up to about 20 satellites for both L1 and L2 GPS frequencies updated at least once a minute.

The DGPS service provider 202 may compute the correction data (including differential corrections) for the rover 104 by first establishing a single virtual DGPSR station at the rover's reported location. In contrast to an installed DGPSR station, a virtual DGPSR station is an imaginary, unoccupied reference station having a virtual location, and for which (virtual) differential correction data is created from existing differential correction data from installed DGPSR stations surrounding the virtual location, as though the (virtual) differential correction data had been observed by an installed DGPSR station at the virtual location. The differential correction from the single virtual DGPSR station can be computed by interpolating the DGPS correction data from the closest (installed) DGPSR stations 102. The DGPS service provider 202 may also use additional information about each satellite's clock and ephemeris errors, as well as ionosphere and troposphere propagation delays, to improve the correction information unique to the rover's approximate location. Position accuracy of better than 10 cm has been demonstrated using this technique.

A significant drawback of the networked DGPS services described in connection with FIG. 2 is that the services require continuous, repeated 2-way communications with the rover 104. Such 2-way communications may not be available at all times and locations (coverage), and the user of the rover is likely to incur a subscription cost (either directly or indirectly). There is also a potential privacy issue since the service provider knows the subscriber rover's location at all times.

Broadcasting a Differential Correction Map (DCM) to Rovers

Embodiments presented below, referred to as Differential Correction Map (DCM) embodiments, mitigate the drawbacks of the networked DGPS subscription service as mentioned above. The DCM embodiments are presented mainly in the context of GPS; however, the DCM embodiments apply generally to, and work equally well in, any GNSS. The DCM embodiments include broadcasting a DCM to rovers by radio over a radio broadcast coverage area (also referred to simply as a broadcast area), instead of using the limited, single-location virtual DGPS correction described above, which obviates the need for the constant 2-way communication between the rover and the DGPS service 202. The DCM represents a compact two-dimensional/surface description of the DGPS correction data over/across the broadcast area. The surface may be planar or the surface may be non-planar. An efficient broadcast mechanism includes broadcast radio, e.g., HD Radio. However, the broadcast could also be over satellite, cellular network, or Internet cloud such as DTS Connected Radio. The broadcasting makes the DCM available to all rovers equipped with a radio receiver to receive the broadcast that are located in the broadcast area. Consequently, the 2-way service is replaced or augmented with the more efficient one-way broadcast of the DCM covering the rover's location.

Figure 3A:
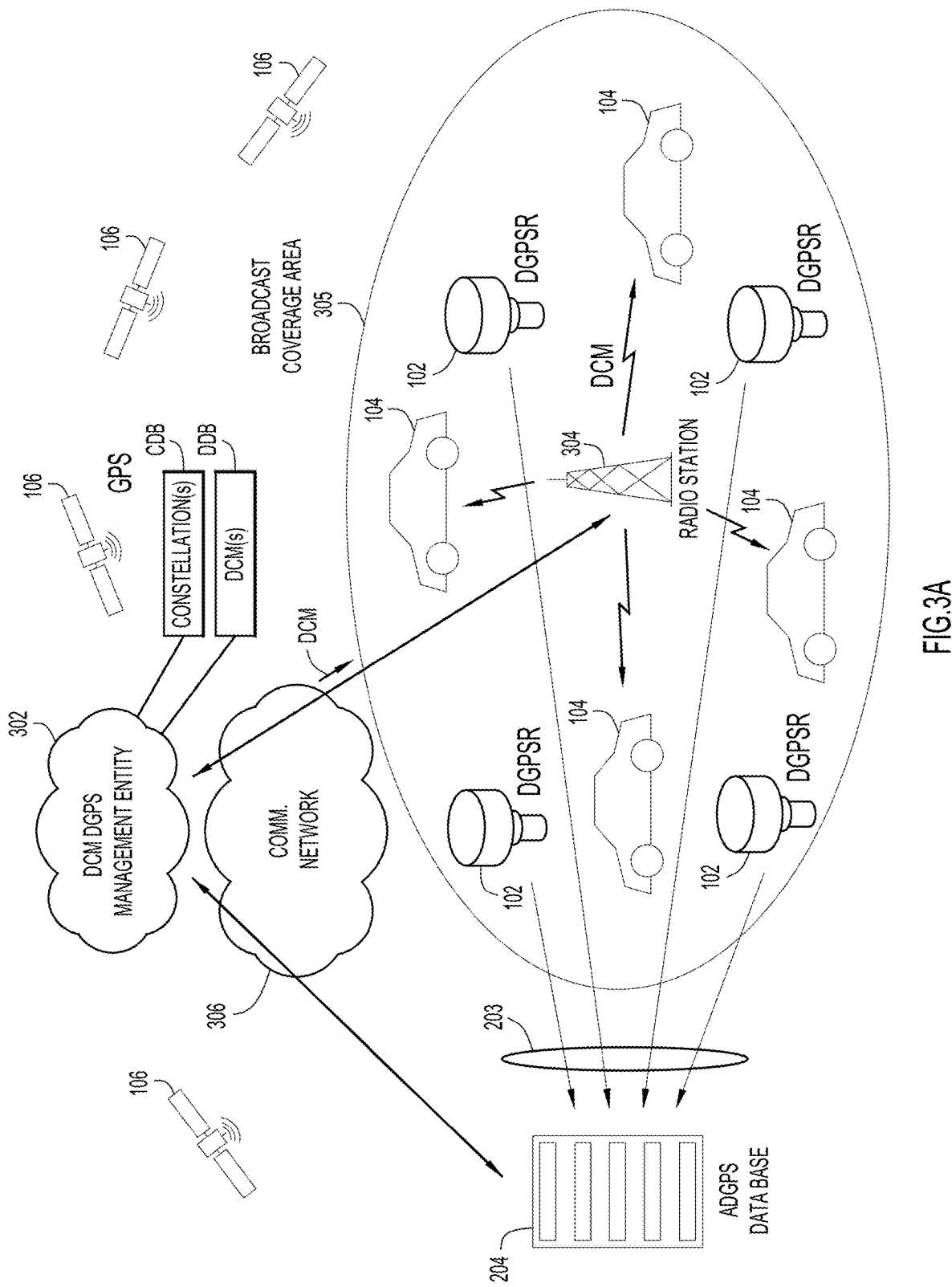
FIG. 3A is an illustration of an example environment that supports a broadcast method of delivering DGPS corrections to rovers via a differential correction map (DCM).

FIG. 3A is an illustration of an example environment that supports broadcasting of DGPS corrections to rovers via a DCM. The environment of FIG. 3A includes the DGPSR stations 102, the rovers 104, and the ADGPS database 204 mentioned above. Additionally, the environment of FIG. 3A includes a DCM DGPS (DDGPS) management entity or service 302 to generate a DCM and assist with disseminating the DCM, a radio station 304 to transmit a radio signal that conveys the DCM across a known broadcast area 305 encompassing the rovers 104, and a communication network 306 connected to the DDGPS management entity, the ADGPS database, and the radio station, and over which the aforementioned entities may communicate. DDGPS management entity 302 (also referred to more simply as management entity 302) may include a service application hosted on one or more computer devices, such as servers, in a cloud-based environment, to implement DCM methods presented herein. Communication network 306 may include wide area networks, such as the Internet, and local area networks.

An example high-level DCM broadcast method is now described briefly. Management entity 302 generates a constellation of virtual DGPS reference stations (not shown in FIG. 3A) having virtual locations spaced-apart across the broadcast area of radio station 304. More generally, the constellation may include/identify the virtual DGPS reference stations, or physical DGPS reference stations, or both. The constellation may include any number of such reference stations; in an example, the constellation includes 4 or more reference stations. Management entity 302 stores information defining the constellation (i.e., stores the constellation) in a constellation database CDB hosted on a server, for example, along with other previously generated constellations.

Management entity 302 retrieves the above-mentioned global DGPS correction data from the ADGPS database 204 over network 306. Management entity 302 computes differential corrections for the virtual DGPSR stations of the constellation based on the information retrieved from the ADGPS database 204 and the virtual locations, and then generates the DCM based on the differential corrections for the constellation. Management entity 302 stores the DCM in a DCM database DDB hosted on the server, for example, along with other previously computed DCMs. Management entity 302 sends the DCM to radio station 304 over communication network 306. In turn, radio station 304 transmits a radio signal carrying the DCM across the broadcast area 305. While depicted as separated, individual entities in FIG. 3A, it is understood that management entity 302 and radio station 304 may, in some embodiments, be implemented as a single, combined entity at a given location.

Rover 104 includes a radio receiver configured to receive the radio signal carrying the DCM, and to recover the DCM from the radio signal. The rover 104 includes a GPS receiver to receive satellite signals and determine an approximate location of the receiver (i.e., the rover) based on the satellite signals. The rover 104 evaluates the DCM at the approximate location, to produce DCM-based differential corrections for the satellite signals at the approximate location. The rover 104 corrects the satellite signals using the DCM-based differential corrections, and determines a more accurate location for the rover based on the (DCM) corrected satellite signals. For example, the rover includes a DGPS processor to evaluate the received DCM at its (i.e., the rover's) own GPS-measured location to determine its unique differential correction data. This differential correction data can be converted to standard RTCM format to conveniently replace the differential correction data delivered to typical RTK GPS receivers.

Figure 3B:
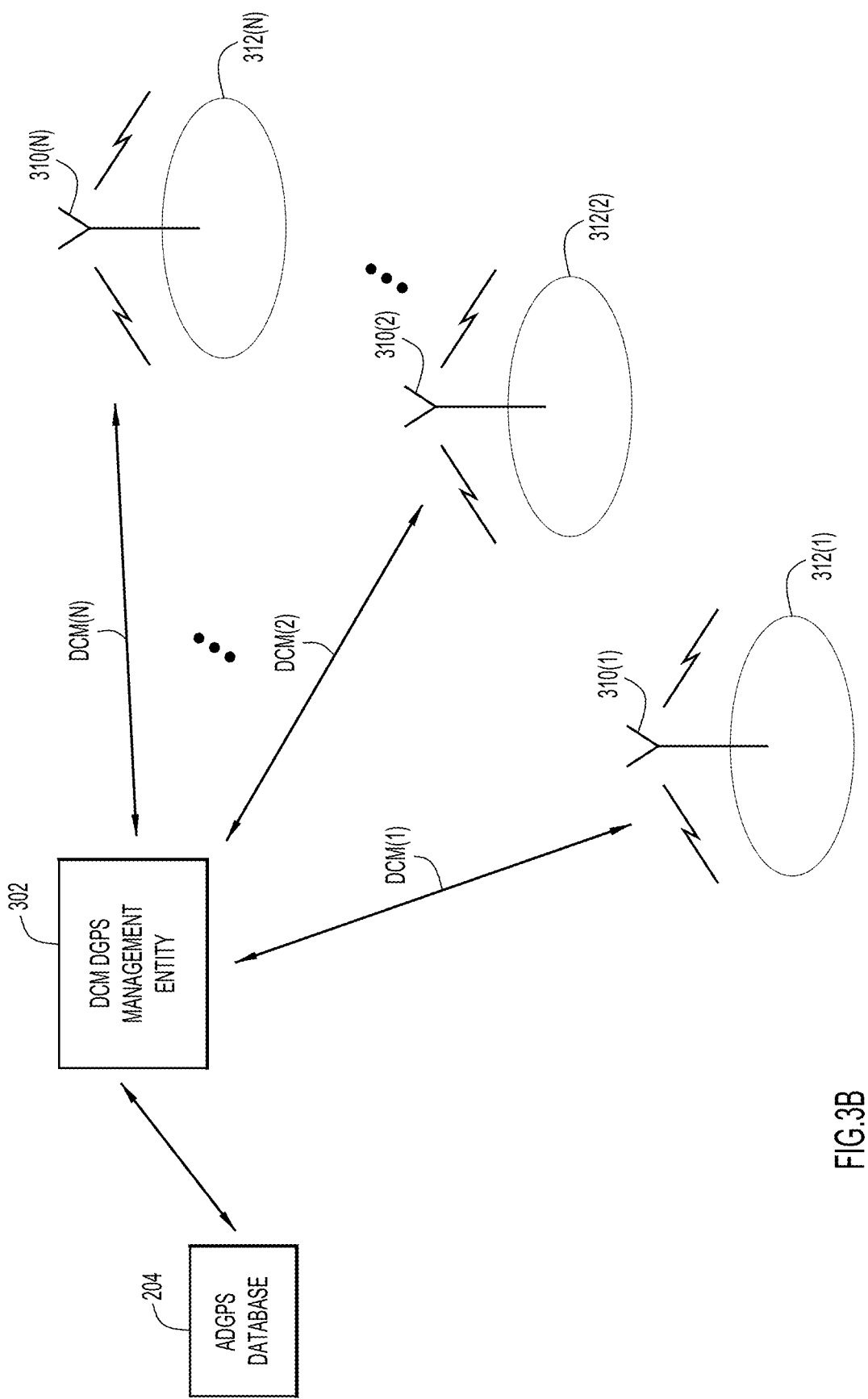
FIG. 3B is an illustration of an example environment that supports a broadcast method of delivering DGPS corrections to rovers across multiple broadcast areas via multiple DCMs.

A single radio station is shown in FIG. 3A by way of example, only; however, it is understood that embodiments may include many geographically separated radio stations connected to the management entity 302 to support dissemination of geographically relevant DCMs across geographically separated broadcast areas, as shown in FIG. 3B. FIG. 3B is an illustration of an example environment that supports broadcasting differential corrections to rovers across multiple broadcast areas via multiple DCMs. The environment of FIG. 3B includes multiple geographically separated radio stations 310(1)-310(N) to transmit respective radio signals in geographically separated respective broadcast areas 312(1)-312(N) encompassing respective rovers (not shown). Management entity 302 generates respective DCMs DCM(1)-DCM(N) for respective ones of broadcast areas 312(1)-312(N) based on respective constellations of virtual DGPSR stations determined for/in each of the broadcast areas. In an example, management entity 302 may select existing constellations from constellation database CDB, and generate the DCMs based on corresponding ones of the selected DCMs. Also, management entity may select the existing DCMs from DCM database DDB. Management entity 302 sends DCM(1)-DCM(N) to respective ones of radio stations 310(1)-310(N), which in turn transmit the DCMs across respective broadcast areas 312(1)-312(N).

Figure 3C:
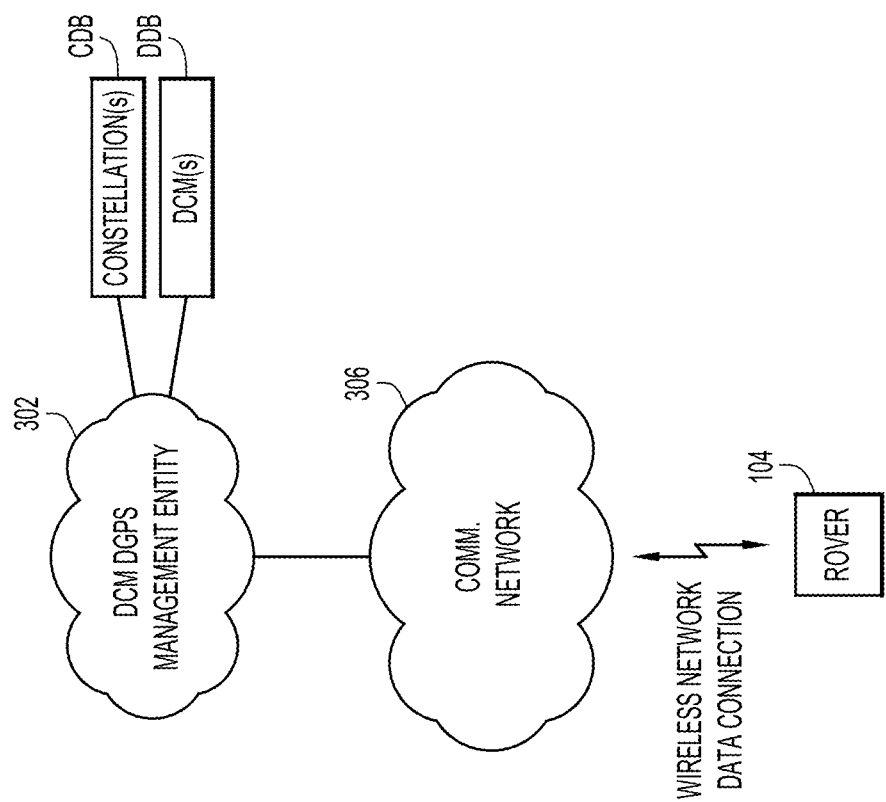
FIG. 3C is an illustration of an example environment in which DCMs are made accessible over a communication network.

FIG. 3C is an illustration of an example environment in which DCMs are made accessible over communication network 306. In the environment of FIG. 3C, rover 104 establishes a wireless network data connection to network 306 based on any known or hereafter developed wireless standard, e.g., the Institute of Electrical and Electronics Engineers (IEEE) 802.11 standards (i.e., WiFi) or the cellular standards, such as the Long Term Evolution (LTE) or other cellular standards. Then, management entity 302 provides to rover 104 data packets including one or more DCMs over network 306 and the wireless connection between the rover and the communication network. Management entity 302 provides to rover 104 the DCM that covers the geographical area in which the rover is located. Management entity 302 and rover 104 may communicate with each using any known or hereafter developed communication protocol, including but not limited to TCP/IP. In one example, management entity 302 may send the DCM to rover 104 in response to a request from the rover for the DCM. In another embodiment, management entity 302 may send the DCM to rover 104 when the management entity detects, through signalling messages originated in network 306, (i) that the rover has connected to the network, and (ii) a general location of the rover indicated in the signaling.

Generating the DCM and providing an efficient mechanism for representing the DCM are described next.

DCM Generation

Management entity 302 can generate the DCM using differential correction data from multiple (i.e., a constellation of) virtual DGPSR stations appropriately spaced over the DCM broadcast area, i.e., the broadcast area of a given radio station. Since actual DGPSR stations sparsely cover many areas, virtual DGPSR stations can be generated conveniently/mathematically from the same DGPS database used by networked DGPS service providers, e.g., the ADGPS database 204. The broadcast area of a typical frequency modulation (FM) broadcast station can span up to about a 100 km radius. Variations in the differential corrections are assumed to be smooth over this area, so the differential corrections can be represented using a somewhat small number of (virtual) DGPSR stations spanning the DCM broadcast area. Present methods use a single virtual DGPSR station to provide a local correction, although it is not sufficient to provide an accurate differential correction over the broadcast area. Three virtual DGPSR stations define a differential correction plane over the broadcast area which can be useful if the change in differential varies approximately linearly with a change in distance, although generally more than three DGPSRs are needed to accurately cover the typical broadcast area.

Several possibilities exist for defining the virtual DGPSR stations. In the embodiments presented herein, DGPSR stations can be located near areas of greater use by rovers and roads with high rover density. Alternatively, virtual DGPSR stations can be arranged in one of a small set of predetermined constellations. For example, the DCM could be described using the differential correction data from 6 virtual DGPSR stations having virtual locations spaced over the broadcast area having a radius of 100 km. Any geographic arrangement of virtual DGPSRs over a broadcast area is called a Virtual Reference Station Constellation (VRSC).

Figure 4:
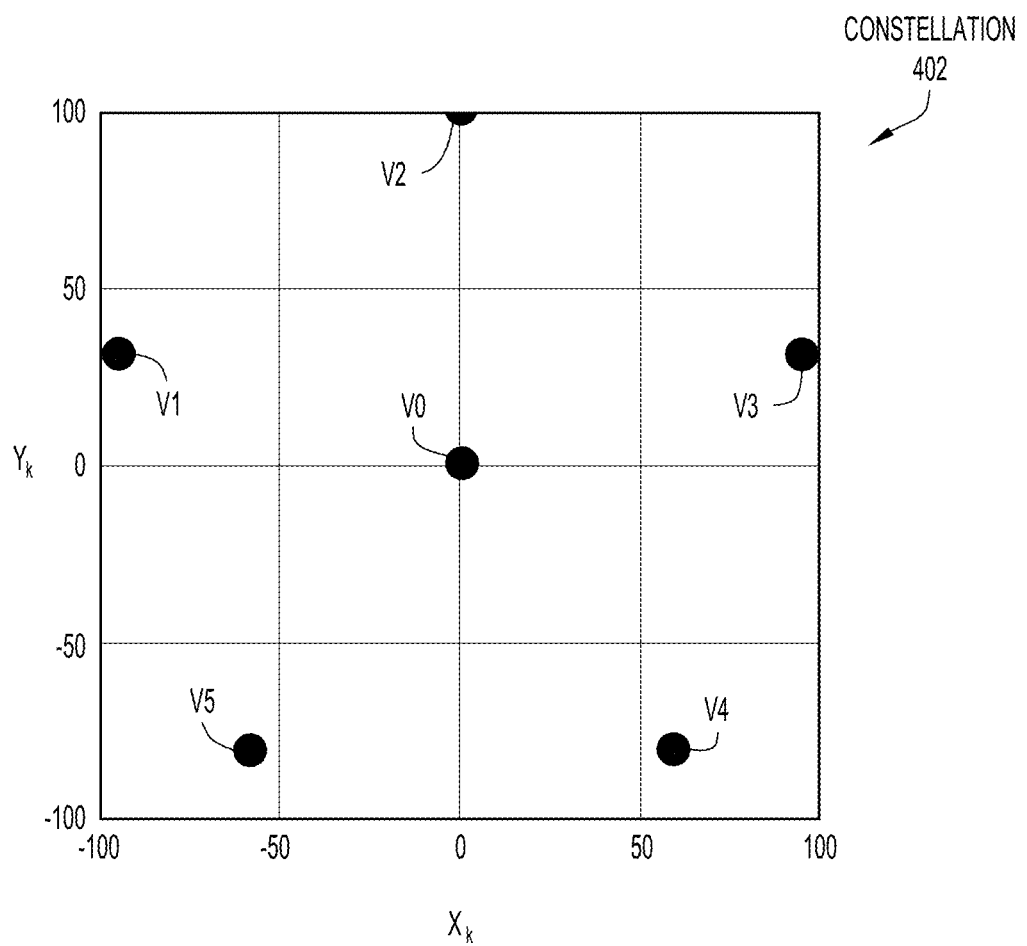
FIG. 4 is an illustration of example virtual DGPSR stations that form a Virtual Reference Station Constellation (VRSC).

FIG. 4 is an illustration of an example VRSC 402 including 6 virtual DGPSR stations V0-V5 located at corresponding virtual locations, where the X and Y axes are in km. An HD radio station/transmitter is assumed to be near the virtual location of center virtual DGPSR station V0. The other 5 virtual DGPSR stations V1-V5 are equally spaced from the center by 100 km, which may be larger or smaller depending on a larger or smaller broadcast area.

The data used to represent a first type of DCM referred to as a DCM Type 0 include differential correction values (dT, a proxy for PRC) for each frequency and each satellite in view, along with the satellite identification for each of the DGPSR stations. Additionally, the locations of the reference stations are conveyed to the rover with the DCM. However, if a common known VRSC is used, then the rover knows the relative locations within that known constellation, and only the absolute position of the constellation (e.g., center virtual DGPSR station location V0) is conveyed to the rover.

The differential corrections should be updated at least several times per minute. For the example of FIG. 4, having 6 virtual DGPSRs in a common known pattern and 20 satellites with frequencies L1 and L2, the minimum DCM size can be estimated at roughly 500 bytes, assuming 2 bytes for each value. Assuming the DCM is broadcast a few times per minute, then the minimum throughput is on the order of a few hundred bits per second.

Since the differential corrections can drift over time, the period between DCM updates should be less than a minute. However, DCM interruptions due to broadcast reception outages could result in excessive errors in the differential corrections. This can be mitigated by broadcasting the drift rate (dT, a proxy for RRC) of the differential corrections along with the DCM. This drift can be estimated by the first derivative, or last difference, of the correction values. Each of these values is small and requires less than one byte.

FIG. 9 is an illustration of an example DCM Type 0 (also referred to as a "Type 0 DCM") that includes an identifier (ID) of the DCM (e.g., 0001, 0002, and so on), a GNSS time (e.g., GPS time), and a location (e.g., latitude/longitude) of a center of a reference station constellation, e.g., center location of reference station V0 of the VRSC described above. The DCM Type 0 may also convey locations of other references stations, e.g., of other virtual DGPSRs of the VRSC, either by identifying a common known reference station pattern or the individual reference station locations, e.g., the virtual DGPSR station locations for reference stations V1-V5 for the VRSC pattern. In addition, the DCM Type 0 also includes the differential correction values for each reference station (e.g., each of reference stations V0-V5), each frequency (e.g., L1, L2), and each of the GPS satellites (e.g., satellite IDs 0-19) in view, as well as some additional information. In an example, each differential correction value may be an equivalent time differential dT represented in centimeters.

Proximity-Weighted Interpolation

As mentioned above, the rover (e.g., rover 104) uses DCM Type 0 to compute the DGPS corrections (also referred to as DCM-based differential corrections) for its approximate location as given by the rover's GPS receiver. In other words, the rover evaluates the DCM at the approximate location, to produce the DCM-based DGPS corrections. It is assumed that the DCM is comprised of the data necessary to describe the differential errors measured by a set of virtual DGPSR stations that span the broadcast area, as described in FIG. 9. Instead of simply using differential corrections determined by the single nearest virtual DGPSR station location, the rover uses an interpolation method in which the differential correction at the approximate location of the rover is influenced by the respective differential corrections of all of the nearby virtual DGPSR stations.

To perform the interpolation, the rover computes a proximity-weighted combination of the respective differential corrections (values) provided in DCM Type 0 influenced by the distance of the approximate location from each of the virtual DGPSR stations. Mathematically, the rover's interpolated differential correction $diff_s$ for satellite s can be calculated using the K differential correction values $dT_{s,k}$ for each of S satellites in view from the K virtual DGPSR stations identified in the DCM. The rover's interpolated differential corrections for each of the S satellites can be computed as $$diff_s = \sum_{k=0}^{K-1} w_k \cdot dT_{s,k}; \quad s = 0, 1, \ldots S-1$$

Define the location of the $k^{th}$ virtual DGPSR station having longitude and latitude coordinates $(x_k, y_k)$. Next define the weight Wk used for the interpolation of the $k^{th}$ virtual DGPSR station's differential correction. This weight is a function of the reciprocal of its distance from the rover location (x,y). A useful expression for the weight Wk is related to the distance from the rover to the $k^{th}$ virtual location $(x_k, y_k)$.

$$w_k = v_k \cdot \text{Norm}$$
$$\text{where } v_k = \frac{1}{[(x-x_k)^2 + (y-y_k)^2]^p + \varepsilon}; \text{ and}$$
$$\text{Norm} = \frac{1}{\sum_{k}^{K-1} v_k}$$

Each weight wk is a function of the distance squared, to the power p, plus E. The power p is used to control the sensitivity of the interpolation to the nearest virtual DGPSR station; the recommended values for p are 1 or 2. The addition of e prevents overflow due to division by zero. The intermediate weights $v_k$ are normalized by Norm such that the weights wk sum to one, preventing a bias factor for dT.

Figure 5A:
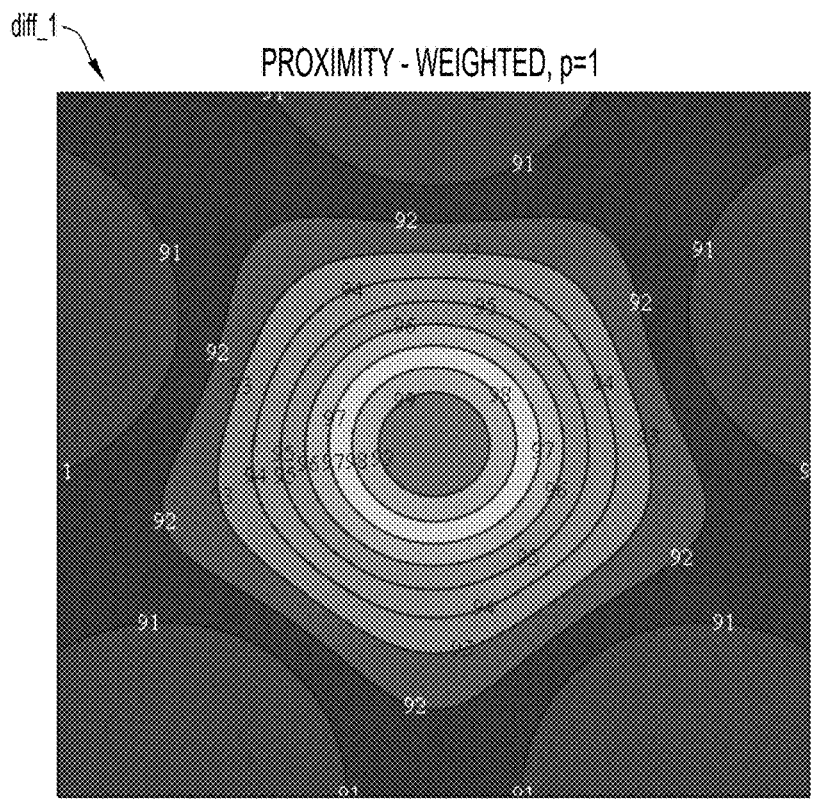
FIG. 5A is an example isometric DCM plot for interpolated DGPSR differential corrections for the VRSC of FIG. 4, for exponent p=1 of a proximity-weighted interpolation based on separation distance.
Figure 5B:
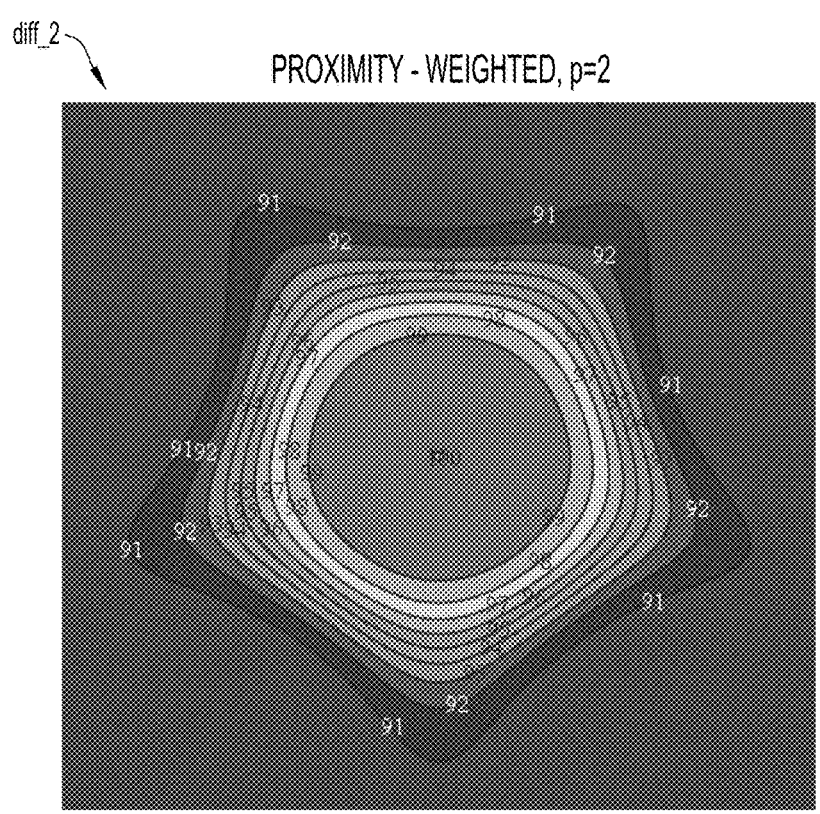
FIG. 5B is an example isometric DCM plot for interpolated DGPSR differential corrections for the VRSC of FIG. 4, for exponent $p=^2$ of a proximity-weighted interpolation based on separation distance.

FIGS. 5A and 5B are example isometric DCM plots diff_1 and diff_2 for 6 interpolated DGPSR differential corrections for a given satellite taken from the example of FIG. 4, for p=1 and p=2, respectively. Arbitrary differential corrections from the virtual DGPSR stations are chosen for this example. The center (V0) DGPSR differential value is set to $dT_{s,0}$=100, and the other five locations to $dT_{s,k}$=90, representing both plots. The units of time for values of dT and diff in this example could be equivalent to centimeters of propagation distance (range) at the speed of light.

Figure 6A:
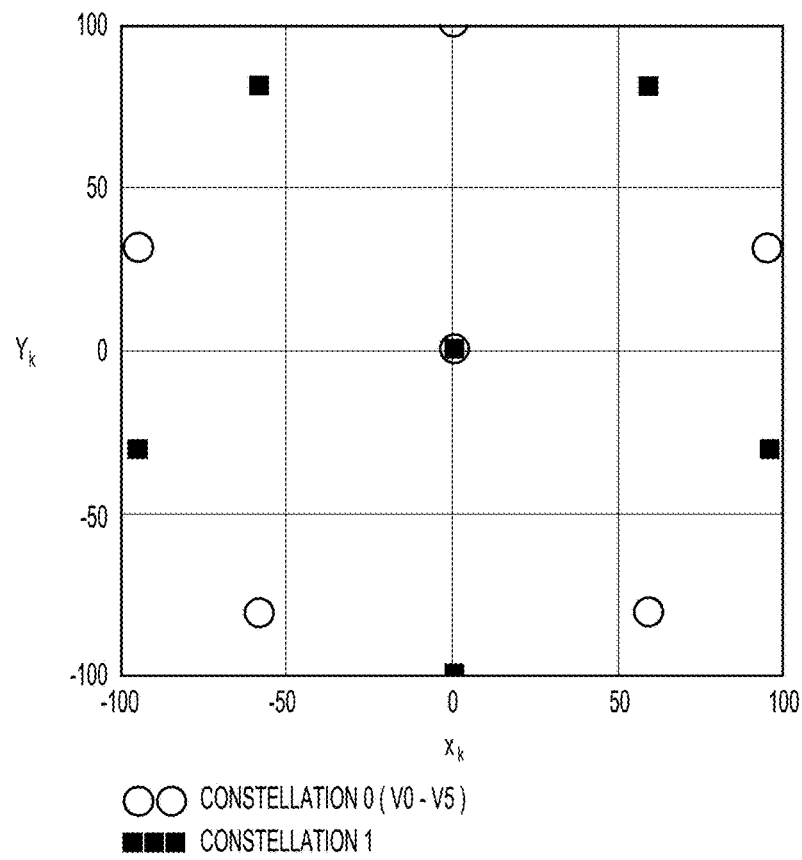
FIG. 6A is an illustration of example complementary VRSCs including the VRSC of FIG. 4.

Management entity 302 can improve overall DCM accuracy by establishing a greater number of virtual DGPSR stations in the constellation. Notice that the plots of FIGS. 5A and 5B show some sensitivity or distortion between the locations of the virtual DGPSR stations. It is not really known what the differential correction values should be without more virtual locations or additional information. However, additional virtual locations increase the amount of DCM data and required transmission throughput. One way to maintain the DCM size while increasing accuracy is to alternate VRSCs and corresponding DCMs on successive transmissions of the DCMs. That is, management entity 302 generates multiple alternating constellations covering the broadcast area (and corresponding DCMs), as shown in FIG. 6A. FIG. 6A shows the virtual DGPSR stations of a first constellation (e.g., the constellation 402 of FIG. 4) as separated circles, and the virtual DGPSR stations of a second/alternate constellation as squares. Notice that the alternate virtual locations (i.e., squares) are spaced between the original virtual locations (i.e., circles) around the outer perimeter, and the center virtual location is repeated. This pair of constellations has complementary symmetric coverage. The alternating constellations result in alternating DCMs, one per constellation, for transmission.

Figure 6B:
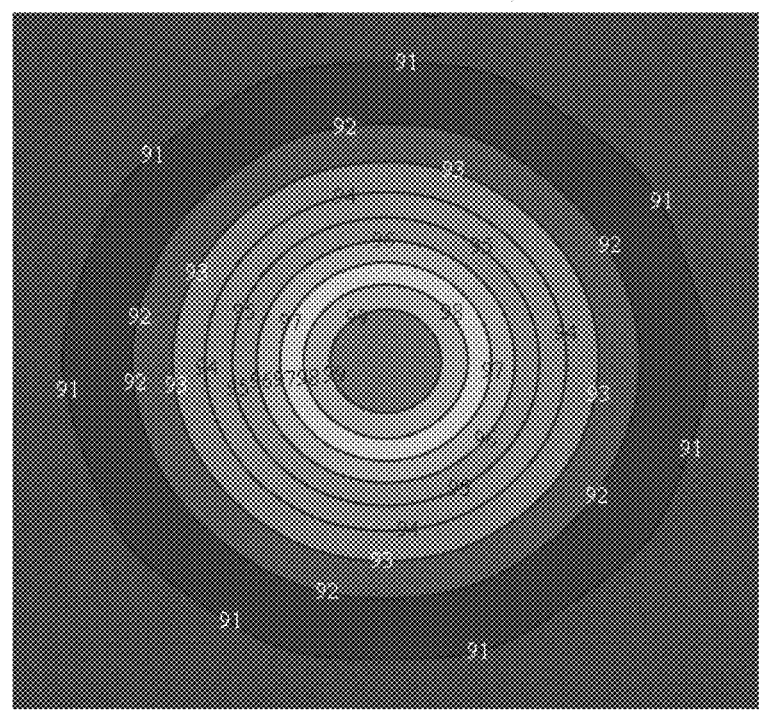
FIG. 6B is an example isometric DCM plot of proximity-weighted interpolated differential corrections averaged across the complementary VRSCs of FIG. 6A.

With respect to alternating DCM constellations, upon startup, the rover uses the first DCM constellation it receives. The rover can average interpolation results from subsequent alternating DCMs for even better resolution accuracy. More generally, this could apply to several alternate constellations, and lossy averaging with an Infinite Impulse Response (IIR) filter could be used. Management entity 302 can identify each constellation of the set of alternate constellations with a constellation/DCM identifier of one or more bits in a header/control field of the DCM, assuming a standard constellation. FIG. 6B is an example isometric DCM plot diff_avg resulting from averaging the consecutive complementary constellations shown in FIG. 6A at the rover. Notice the apparent reduced sensitivity or distortion between the reference locations.

Polynomial Interpolation

The Proximity-weighted interpolation described above in connection with constellation 402 of FIG. 4 includes the known locations of the virtual DGPSR stations V0-V5 and their differential errors. The rover interpolates between the differential errors of DCM Type 0.

Alternatively, the previously described DCM Type 0 of FIG. 9 used in proximity-weighted interpolation can be replaced with a second type of DCM, referred to as a DCM Type 1 (also referred to as a "Type 1 DCM"), which is a polynomial-fit DCM, described below in connection with FIG. 10. DCM Type 1 could use the same 6 virtual locations discussed above, or different ones. DCM Type 1 for satellite s of the previous example using 6 virtual DGPSR stations, V0 through V5, can be described using 6 scalar polynomial coefficients A, B, C, D, E, F for each frequency of each satellite in view.

$$diff_s = A_s + B_s \cdot x + C_s \cdot y + D_s \cdot x^2 + E_s \cdot y^2 + F_s \cdot x \cdot y$$

The polynomial coefficients can be derived using the virtual DGPSR locations and differential corrections dT. The 6 $(x_k, y_k)$ coordinates form a linear system of 6 two-dimensional quadratic equations to solve for the polynomial coefficients for each satellite in view.

$$A + B \cdot x_0 + C \cdot y_0 + D \cdot x_0^2 + E \cdot y_0^2 + F \cdot x_0 \cdot y_0 = dT_0$$
$$A + B \cdot x_1 + C \cdot y_1 + D \cdot x_1^2 + E \cdot y_1^2 + F \cdot x_1 \cdot y_1 = dT_1$$
$$A + B \cdot x_2 + C \cdot y_2 + D \cdot x_2^2 + E \cdot y_2^2 + F \cdot x_2 \cdot y_2 = dT_2$$
$$A + B \cdot x_3 + C \cdot y_3 + D \cdot x_3^2 + E \cdot y_3^2 + F \cdot x_3 \cdot y_3 = dT_3$$
$$A + B \cdot x_4 + C \cdot y_4 + D \cdot x_4^2 + E \cdot y_4^2 + F \cdot x_4 \cdot y_4 = dT_4$$
$$A + B \cdot x_5 + C \cdot y_5 + D \cdot x_5^2 + E \cdot y_5^2 + F \cdot x_5 \cdot y_5 = dT_5$$

which can be more-compactly represented in matrix form as $$Q \cdot \begin{pmatrix} A \\ B \\ C \\ D \\ E \\ F \end{pmatrix} = dT$$

Where $Q = \begin{pmatrix} 1 & x_0 & y_0 & x_0^2 & y_0^2 & x_0 \cdot y_0 \\ 1 & x_1 & y_1 & x_1^2 & y_1^2 & x_1 \cdot y_1 \\ 1 & x_2 & y_2 & x_2^2 & y_2^2 & x_2 \cdot y_2 \\ 1 & x_3 & y_3 & x_3^2 & y_3^2 & x_3 \cdot y_3 \\ 1 & x_4 & y_4 & x_4^2 & y_4^2 & x_4 \cdot y_4 \\ 1 & x_5 & y_5 & x_5^2 & y_5^2 & x_5 \cdot y_5 \end{pmatrix}$ and $dT = \begin{pmatrix} dT_0 \\ dT_1 \\ dT_2 \\ dT_3 \\ dT_4 \\ dT_5 \end{pmatrix}$ Then $\begin{pmatrix} A \\ B \\ C \\ D \\ E \\ F \end{pmatrix} = Q^{-1} \cdot dT$ Q is a 6 by 6 matrix of elements derived from the VRSC coordinates, V0 through V5, in the DCM polynomial.

Figure 7A:
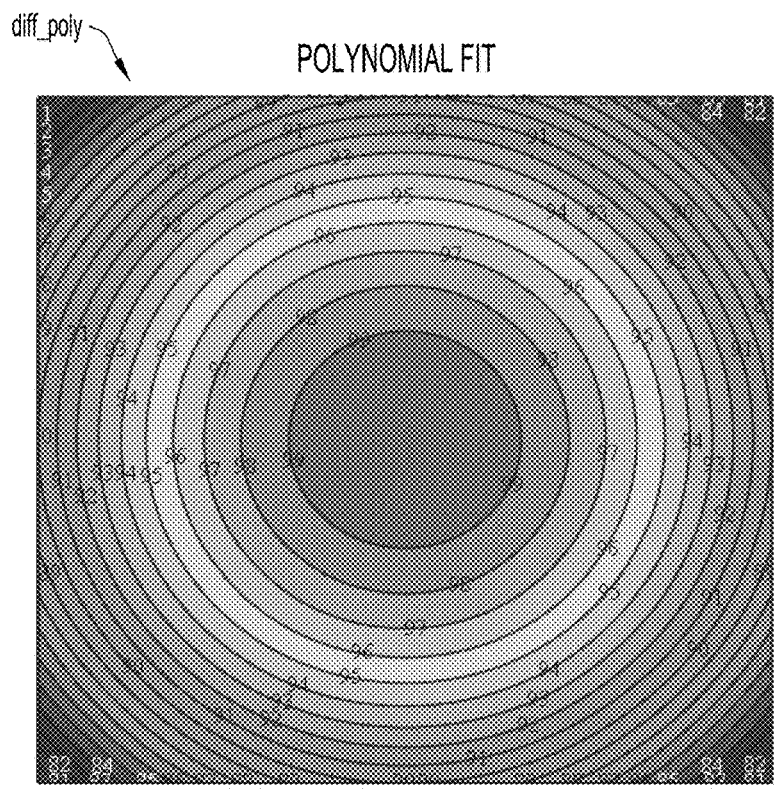
FIG. 7A is an example isometric DCM plot from a quadratic polynomial fit of virtual DGPSR stations.
Figure 7B:
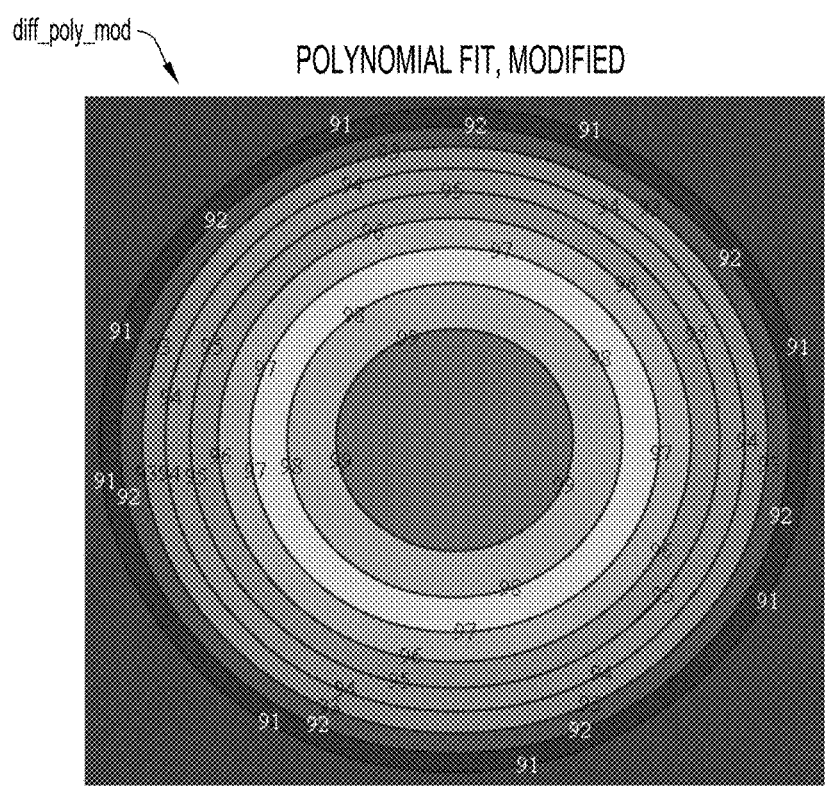
FIG. 7B is an example isometric DCM plot from a modified quadratic polynomial fit of the virtual DGPSR stations from FIG. 7A.

FIG. 7A presents an isometric DCM plot diff_poly for the constellation 402 of FIG. 4 using a two-dimensional quadratic polynomial fit (also referred to simply as a "polynomial") representation of DCM Type 1. The radio receiver (and associated DCM processing) at the rover needs no knowledge of the virtual DGPSR locations using polynomial representation, other than the absolute location of the VRSC (e.g., V0). So any convenient VRSC can be used in creating the DCM polynomial. Although DCM Type 1 passes through all the reference points, the distant portions of the DCM tend to increase or decrease "quadratically" with the square of the distance from center. Within the broadcast area, this may be mitigated by limiting the computed radial distance from the center location of the DCM. This modification is shown in the isometric DCM plot diff_poly_mod of FIG. 7B, which shows that the isometric values are lower bounded to about 90 cm (the lowest of the DGPSR values).

The polynomial representation of DCM Type 1 can be converted to an equivalent DCM Type 0 representation of the VRSC shown in FIG. 9. This is accomplished simply by evaluating the polynomial at the virtual DGPSR locations. Conversely, it was already shown that a polynomial representation can be derived from a VRSC. However, at least K virtual DGPSR stations are preferably used to derive a polynomial with K coefficients. Furthermore, the useful choices of K for 2-dimensional polynomials are 3 (linear), 6 (quadratic), 10 (cubic), 15 (quartic), 21 (quintic), etc.

Both the proximity-weighted and the polynomial interpolation methods produce different interpretations of the DCM. Although the 2 interpolation methods produce DCMs having the same correction values (diff) at the virtual DGPSR locations, the resulting DCMs differ at other locations. Overall DCM accuracy can be improved by adding more virtual locations or higher-order polynomials. The accuracy of DCM Type 0 interpolation using the proximity-weighted method can be improved by adjusting the power p in the interpolation expression. Additional reference locations are then used to determine which power p offers a better fit. This can be attractive since the only additional information conveyed by the DCM is p.

The accuracy of the polynomial representation of DCM Type 1 can be improved without increasing its order above K by using least mean square (LMS) methods to fit more than K reference locations, although the reference locations will no longer be exact solutions to the polynomial. Furthermore, overall error can be reduced by averaging polynomials of alternate VRSCs with interlaced location spacing at DCM creation. No additional information needs to be conveyed with the DCM in this case.

Figure 8:
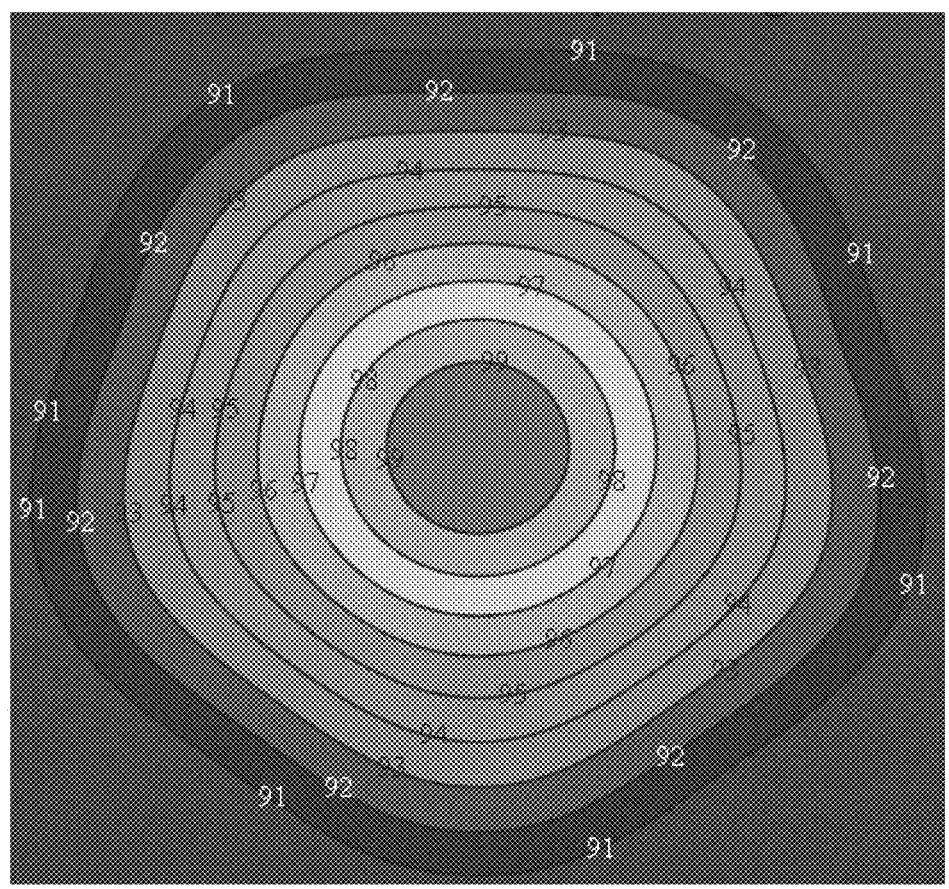
FIG. 8 is an example isometric DCM plot from an average fit of modified polynomial and proximity-weighted interpolation methods.

The DCM accuracy can also be improved by using a weighted average of both the proximity-weighted and polynomial interpolation methods. An additional weighting parameter α that reduces the overall DCM error can be conveyed with the DCM to enable this averaging at the receiver. A weighted average example ($\alpha=0.5$) for the single 6-location constellation example is shown in FIG. 8. In other words, FIG. 8 is an illustration of an example isometric DCM plot for an average fit of the modified polynomial and proximity-weighted interpolation methods.

$$\text{diff}_s = \alpha \cdot \text{diff\_prox}_s + (1-\alpha) \cdot \text{diff\_poly}_s$$

Encryption of DCM

Broadcast of the DCM makes the service available to all rovers within the broadcast area. The DCM can be encrypted if conditional access is desired; for example if a subscription service is offered. Encryption can be implemented by assigning each receiver a unique code (e.g., serial number). A monthly encryption key could be used to update subscribers through internet access.

Flowcharts

FIGS. 11, 12, and 13A-13D present flowcharts of various methods directed to DCMs drawn from operations described above.

Figure 11:
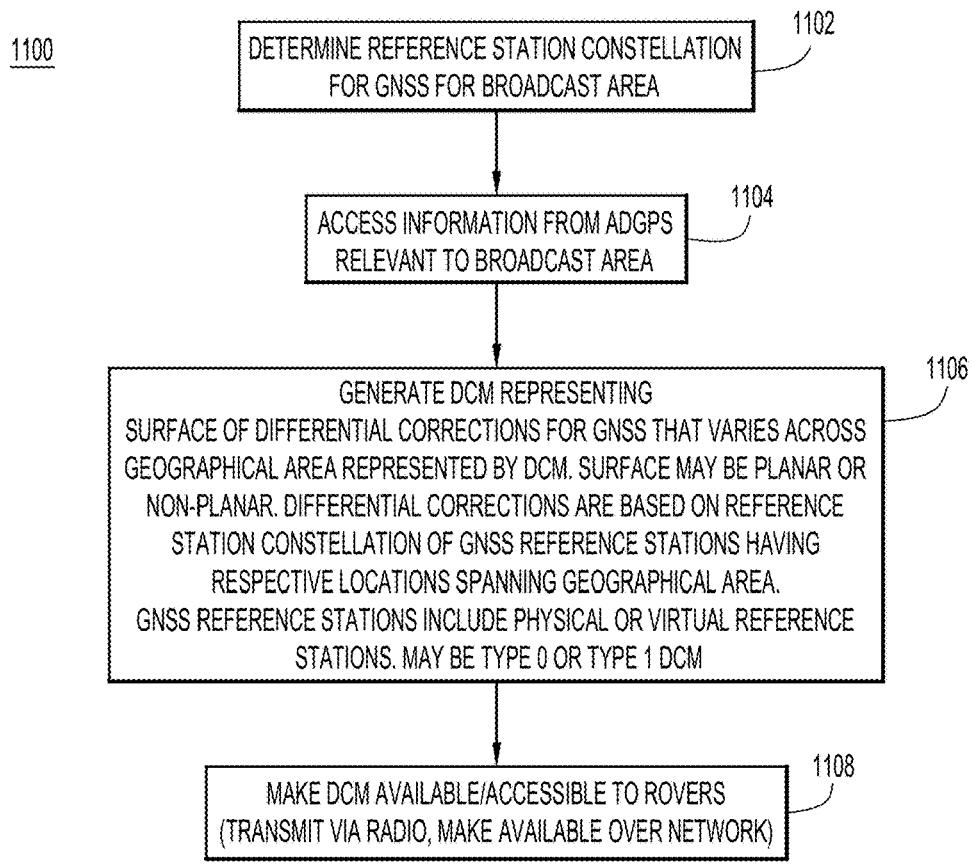
FIG. 11 is a flowchart of an example method of generating and disseminating a DCM that may be performed in any of the environments of FIGS. 3A-3C.

FIG. 11 is a flowchart of an example method 1100 of generating and disseminating a DCM in any of the environments of FIGS. 3A-3C.

At 1102, management entity 302 determines/establishes a reference station constellation of GNSS reference stations for a geographical area. To do this, management entity 302 may initially define/generate the reference station constellation, or the management entity may select the reference station constellation from among a set of predetermined reference station constellations. If the determined reference station constellation is not presently stored in memory, management entity 302 stores the reference station constellation to memory, e.g., to constellation database CDB. The reference stations of the reference station constellation may include only physical reference stations, only virtual reference stations, or a mix of both. In one arrangement, the reference stations have locations that are non-uniformly spaced across the geographical area. In another arrangement, the references stations have locations that are approximately uniformly spaced across the geographical area. In the latter arrangement, the reference stations may all be virtual reference stations. In an embodiment, the reference station constellation includes at least four reference stations.

At 1104, management entity 302 access/retrieves from ADGPS database 204 aggregated differential correction information corresponding to the geographical area.

At 1106, management entity 302 generates a DCM representing a surface of differential corrections (e.g., dTs) for the GNSS, wherein the surface of the differential corrections varies across the geographical area represented by the DCM. In one embodiment, the surface of the differential corrections may be planar. In another embodiment, the surface of the differential corrections may be non-planar in that a first derivative across any line (e.g., latitude or longitude) over the surface may not be constant, e.g., is not constant. The differential corrections are based on the reference station constellation of reference stations (which may include the physical or the virtual reference stations) having respective locations spanning the geographical area, and the information accessed from ADGPS database 204. The surface of the DCM is configured to be evaluated at any location in the geographical area, to produce DCM-based differential corrections for that location.

Management entity 302 may generate the DCM as a DCM Type 0, which is a representation of the reference station constellation. The DCM Type 0 includes a DCM identifier (ID), GNSS time, the locations of one or more of the reference stations, and differential corrections for each reference station. More specifically, the DCM includes information as shown in FIG. 9, such as the GNSS time, locations of the reference stations, an identifier of each GNSS satellite in view of the geographical area represented by the DCM, and the differential correction for each reference station for each frequency of each GNSS satellite in view. The DCM may further include a drift rate of the differential correction (e.g., dT) for each reference station for each frequency of each GNSS satellite in view. This drift rate can be estimated by the first derivative (dT), or last difference, of the differential correction values.

Management entity 302 may generate the DCM as a DCM Type 1, in which case the management entity generates the DCM from a two-dimensional polynomial surface fit to the differential correction associated with each frequency and each GNSS satellite in view of the geographical area represented by the DCM. The DCM Type 1 is an indirect representation of the reference station constellation compared to the DCM Type 0. The DCM Type 1 includes a DCM identifier (ID), GNSS time, the locations of one or more of the reference stations, and polynomial coefficients of the polynomial surface fit for the differential corrections for the reference stations. More specifically, the DCM Type 1 includes information as shown in FIG. 10, which shows an example DCM Type 1 based on the polynomial fit corresponding to the constellation 402 of FIG. 4. The DCM Type 1 includes the GNSS time, an origin of the two-dimensional polynomial surface fit (e.g., the location of reference station V0), an identifier of each of the GNSS satellites (e.g., satellite IDs SAT ID 0-19) in view of the geographical area represented by the DCM, polynomial coefficients for the reference stations associated with the two-dimensional polynomial surface fit (e.g., polynomial coefficients A-F for reference stations V0-V6, respectively). The DCM may also include a drift rate of each polynomial coefficient for each frequency of each GNSS satellite in view. This drift rate can be estimated by the first derivative, or last difference, of the polynomial coefficients Management entity optionally encrypts the DCM using any known or hereafter developed encryption technique.

At 1108, management entity 302 makes the DCM (in encrypted or unencrypted form) accessible to interested entities. In one embodiment, management entity 302 makes the DCM accessible over communication network 306, in which case a rover 104 may connect to the network and access the DCM over the network. In another embodiment, management entity 302 provides the DCM to a radio transmitter (e.g., radio transmitter 304) that broadcasts the DCM across the geographical area via a radio signal, i.e., the radio signal is modulated to convey the DCM. This enables rovers 104 in the geographical area to receive the DCM via the radio signal. Example broadcast radio outlets for transmitting the DCM include, but are not limited to, FM subsidiary communications authorization (SCA) digital subcarrier (e.g., RBDS), digital radio broadcast (e.g., HD Radio, digital audio broadcast (DAB), Digital Radio Mondiale (DRM), and the like), digital satellite broadcast (e.g., Sirius XM), and digital TV broadcast.

The information in ADGPS database 204 and/or the constellation used in a given coverage are dynamic and thus may change periodically. Accordingly, method 1100 repeats over time to periodically update the DCM so that the DCM accurately reflects such changes.

When rovers 104 located in the geographical area receive the DCM, the rovers may evaluate the received DCM at their respective locations to derive accurate locations for the rovers, as described herein. For example, a given rover may use a GPS receiver to derive an approximate location of the rover based on GPS satellite signals, evaluate the (received) DCM at the approximate location to produce DCM-based differential corrections at the approximate location, and then correct the satellite signals using the DCM-based differential corrections, to produce a more accurate location of the rover.

Variations of method 1100 are possible. In one variation, at operation 1102, management entity 302 selects a VRSC from a predetermined set of VRSCs, and generates the DCM from the selected predetermined VRSC.

In another variation, management entity 302 generates multiple DCMs based on multiple reference station constellations (i.e., one DCM per corresponding VRSC) for approximately the same geographical area, and alternately transmits the multiple DCMs. For example, management entity transmits a first DCM, a second DCM, a third DCM, and then the first DCM, the second DCM, the third DCM, and so on.

In yet another variation, management entity 302 generates multiple DCMs including a DCM Type 0 and a DCM Type 1 for the same geographical area, and then transmits both DCMs, e.g., alternately transmits the DCMs.

Generate DCM operation 1106 is described above in connection with other operations of method 1100 by way of example, only. It is understood that generate DCM operation 1106, taken alone, represents a stand-alone operation or method. In other words, operation 1106 alone represents its own single-operation method for which operations 1102, 1104, and 1108 are unnecessary or not essential.

Figure 12:
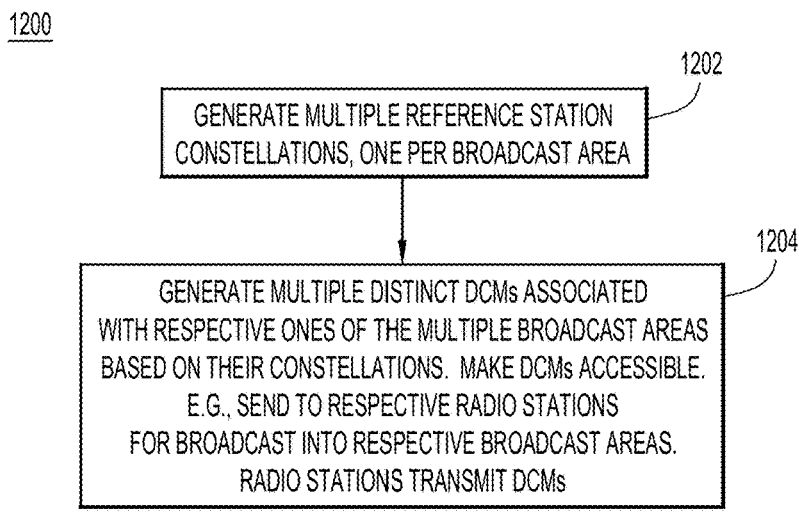
FIG. 12 is a flowchart of an example method of generating and broadcasting multiple DCMs across multiple broadcast coverage areas performed in the network environment of FIG. 3B.

FIG. 12 is a flowchart of an example method 1200 of generating and broadcasting multiple DCMs across multiple broadcast areas performed in the network environment of FIG. 3B.

At 1202, management entity 302 generates multiple reference station constellations, each corresponding to a respective one of broadcast areas 312(1)-312(N). Each constellation includes reference stations located in the broadcast area to which the constellation corresponds.

At 1204, management entity 302 generates multiple distinct DCMs DCM(1)-DCM(N), each uniquely associated with a respective one of multiple broadcast areas 312(1)-312(N), and each based on a respective one of the multiple reference station constellations. Management entity 302 provides the DCMs DCM(1)-DCM(N) to respective ones of radio stations 310(1)-310(N), which transmit the DCMs into their respective broadcast areas.

Figure 13A:
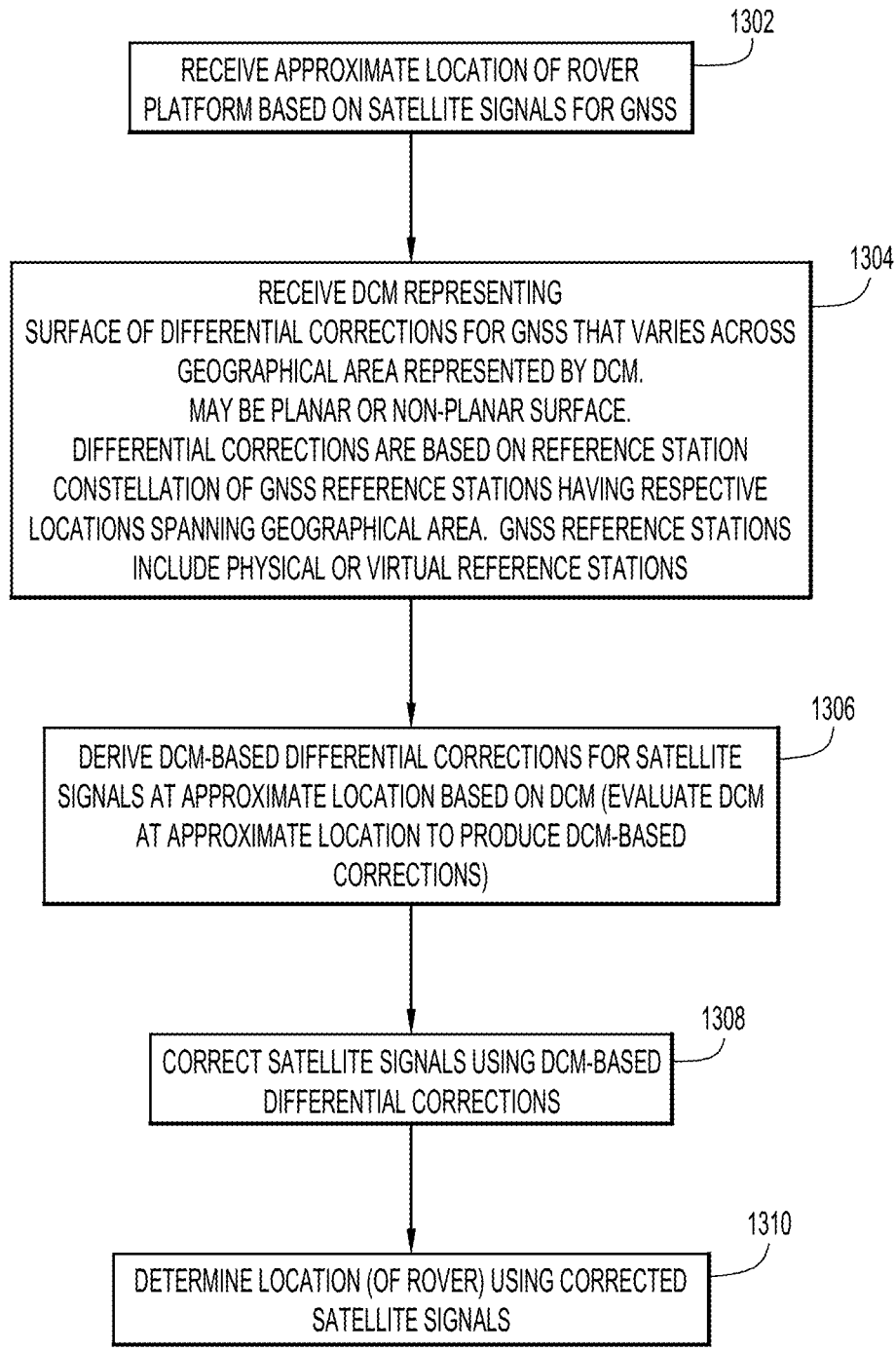
FIG. 13A is a flowchart of an example method of processing a DCM, performed by a processor of a rover.

FIG. 13A is a flowchart of an example method 1300 of processing the DCM, performed by a processor (e.g., processor 1506) of a rover platform (e.g., rover 104). The rover platform may also include GPS receiver 1502, radio receiver 1504, and/or wireless network interface unit (NIU) 1505, as well as memory, coupled to the processor, as described below in connection with FIG. 15.

At 1302, the processor receives an approximate location of the rover platform based on satellite signals for a GNSS.

For example, GPS receiver 1502 may receive the satellite signals, determine the approximate location of the rover platform based on the satellite signals (e.g., time delays associated with the satellite signals), and provide the approximate location to the processor.

At 1304, the processor receives a DCM. For example, radio receiver 1504 receives a broadcast radio signal that conveys the DCM, and provides the DCM to the processor. Alternatively, NIU 1505 receives data packets that convey the DCM over a wireless network connection, and sends the DCM to the processor. The DCM represents a non-planar surface of differential corrections for the GNSS that varies across a geographical area represented by the DCM. The differential corrections are based on a reference station constellation of GNSS reference stations having respective locations spanning the geographical area. The GNSS reference stations may include physical and/or virtual reference stations.

A first type of DCM includes a DCM identifier (ID), GNSS time, the locations of one or more of the reference stations, and differential corrections for each reference station.

A second type of DCM includes a DCM identifier (ID), GNSS time, the locations of one or more of the reference stations, and polynomial coefficients of a polynomial fit for the differential corrections for the reference stations.

At 1306, the processor derives DCM-based differential corrections for the satellite signals at the approximate location based on the DCM.

For the first type of DCM, the processor interpolates the DCM at the approximate location to produce the DCM-based differential corrections as interpolated differential corrections. The interpolating includes proximity-weighting the differential corrections of the reference stations as a function of distances between the approximate location and the locations of the reference stations, and combining the proximity-weighted differential corrections to produce the interpolated differential corrections.

For the second type of DCM, the processor evaluates the polynomial-fit at the approximate location using the polynomial coefficients.

At 1308, the processor corrects the satellite signals using the DCM-based differential corrections, to produce corrected satellite signals.

At 1310, the processor determines a location of the rover platform using the corrected satellite signals. The processor may use the location in any number of navigation applications hosted on the rover, including display of the location.

Figure 13B:
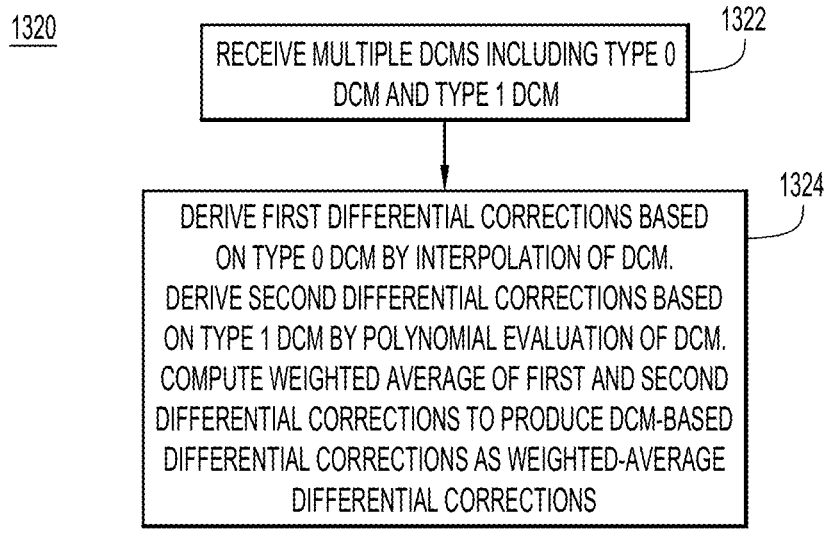
FIG. 13B is a flowchart of an example method of processing multiple DCMs based on the method of FIG. 13A.

FIG. 13B is a flowchart of an example method 1320 of processing multiple DCMs that expands on or is alternative to operations 1304 and 1306 described above, performed by the processor of the rover platform.

At 1322, the processor receives multiple DCMs including a first DCM of the first type mentioned above in method 1300 and a second DCM of the second type mentioned above.

At 1324, the processor:
a. Derives first differential corrections based on the first DCM using the interpolating described above;
b. Derives second differential corrections based on the second DCM using the evaluating the polynomial described above; and
c. Computes a weighted average of the first differential corrections and the second differential corrections, to produce the DCM-based differential corrections as weighted-averaged differential corrections.

Figure 13C:
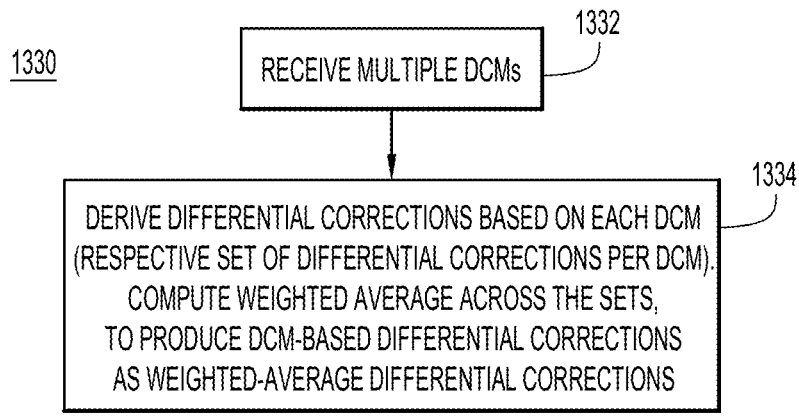
FIG. 13C is a flowchart of another example method of processing multiple DCMs based on the method of FIG. 13A.

FIG. 13C is a flowchart of an example method 1330 of processing multiple DCMs that expands on or is alternative to operations 1304 and 1306 described above, performed by the processor of the rover platform.

At 1332, the processor receives multiple DCMs, which may be of the first type or the second type.

At 1334, the processor derives differential corrections based on each DCM, and computes a weighted average of the differential corrections from the multiple DCMs, to produce the DCM-based differential corrections as weighted-averaged differential corrections.

Figure 13D:
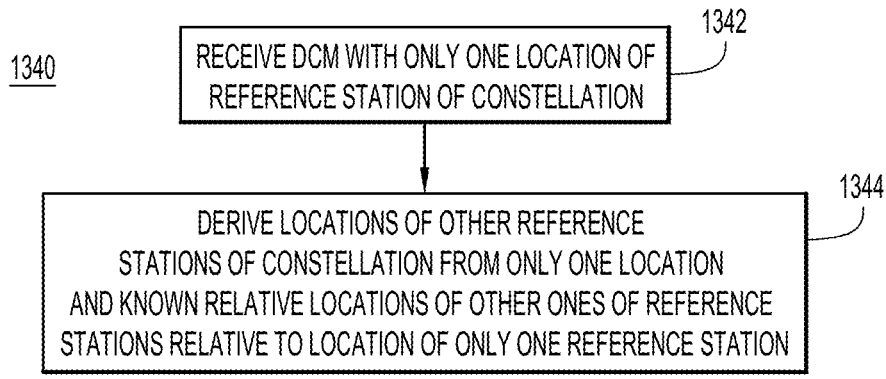
FIG. 13D is a flowchart of another example method of processing a DCM based on the method of FIG. 13A.

FIG. 13D is a flowchart of an example method 1340 of processing a DCM that expands on or is alternative to method 1300.

At 1342, the processor receives a DCM of the first type or the second type, and which includes the location of only one of the reference stations of the constellation.

At 1344, the processor derives locations of other reference stations of the constellation from the location of the only one reference station and known relative locations of other ones of the reference stations relative to the location of the only one reference station that are stored in the memory of the rover as a priori information.

Once all of the locations of the reference stations are known from 1342 and 1344, the processor derives the DCM-based differential corrections as described above.

Management Entity, Rover, and Transmit Station Block Diagrams

Figure 14:
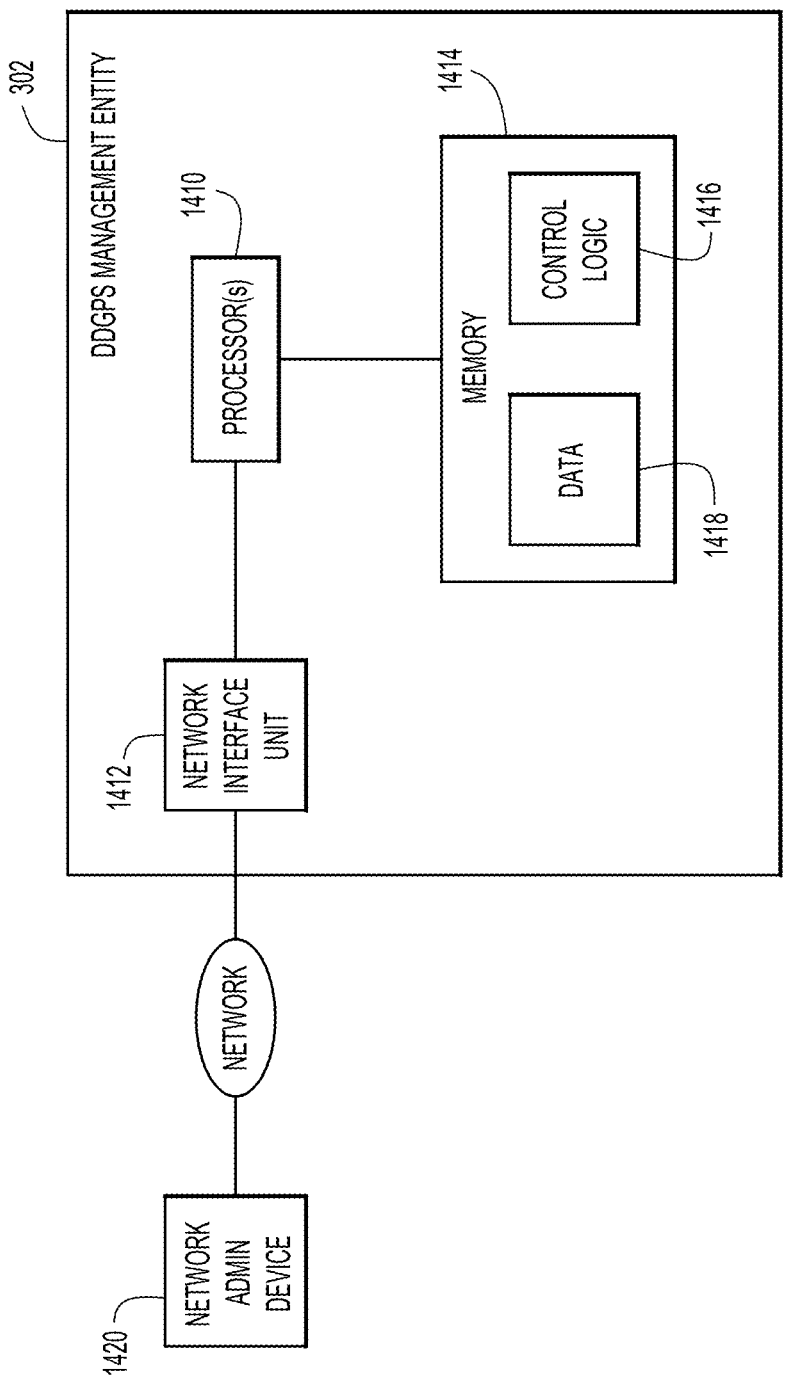
FIG. 14 is a block diagram of an example DCM DGPS management entity used to generate and assist with broadcasting a DCM.

With reference to FIG. 14, there is shown an example block diagram for DDGPS management entity 302. In the example, management entity 302 includes a computer system, such as a server, having one or more processors 1410, a network interface unit (NIU) 1412, and a memory 1414. Memory 1414 stores control software 1416 (referred as "control logic"), that when executed by the processor(s) 1410, causes the computer system to perform the various operations described herein for management entity 302.

The processor(s) 1410 may be a microprocessor or microcontroller (or multiple instances of such components). The NIU 1412 enables management entity 302 to communicate over wired connections or wirelessly with a network, such as network 306. NIU 1412 may include, for example, an Ethernet card or other interface device having a connection port that enables management entity 302 to communicate over the network via the connection port. In a wireless embodiment, NIU 1412 includes a wireless transceiver and an antenna to transmit and receive wireless communication signals to and from the network.

The memory 1414 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1414 may comprise one or more tangible (non-transitory) computer readable storage media (e.g., memory device(s)) encoded with software or firmware that comprises computer executable instructions. For example, control software 1416 includes logic to implement operations performed by the management entity 302. Thus, control software 1416 implements the various methods/operations described above, including methods 1100 and 1200. Memory 1414 also stores data 1418 generated and used by control software 1416, including DCMs (e.g., DCM database DDB), information for constellations of virtual and/or physical DGPSR stations (e.g., constellation database CDB), and aggregated correction information, and so on.

A user, such as a network administrator, may interact with management entity 302 through a user device 1420 (also referred to as a "network administration device") that connects by way of a network with management entity 302. The user device 1420 may be a personal computer (laptop, desktop), tablet computer, SmartPhone, and the like, with user input and output devices, such as a display, keyboard, mouse, and so on. Alternatively, the functionality and a display associated with user device 1420 may be provided local to or integrated with management entity 302.

Figure 15:
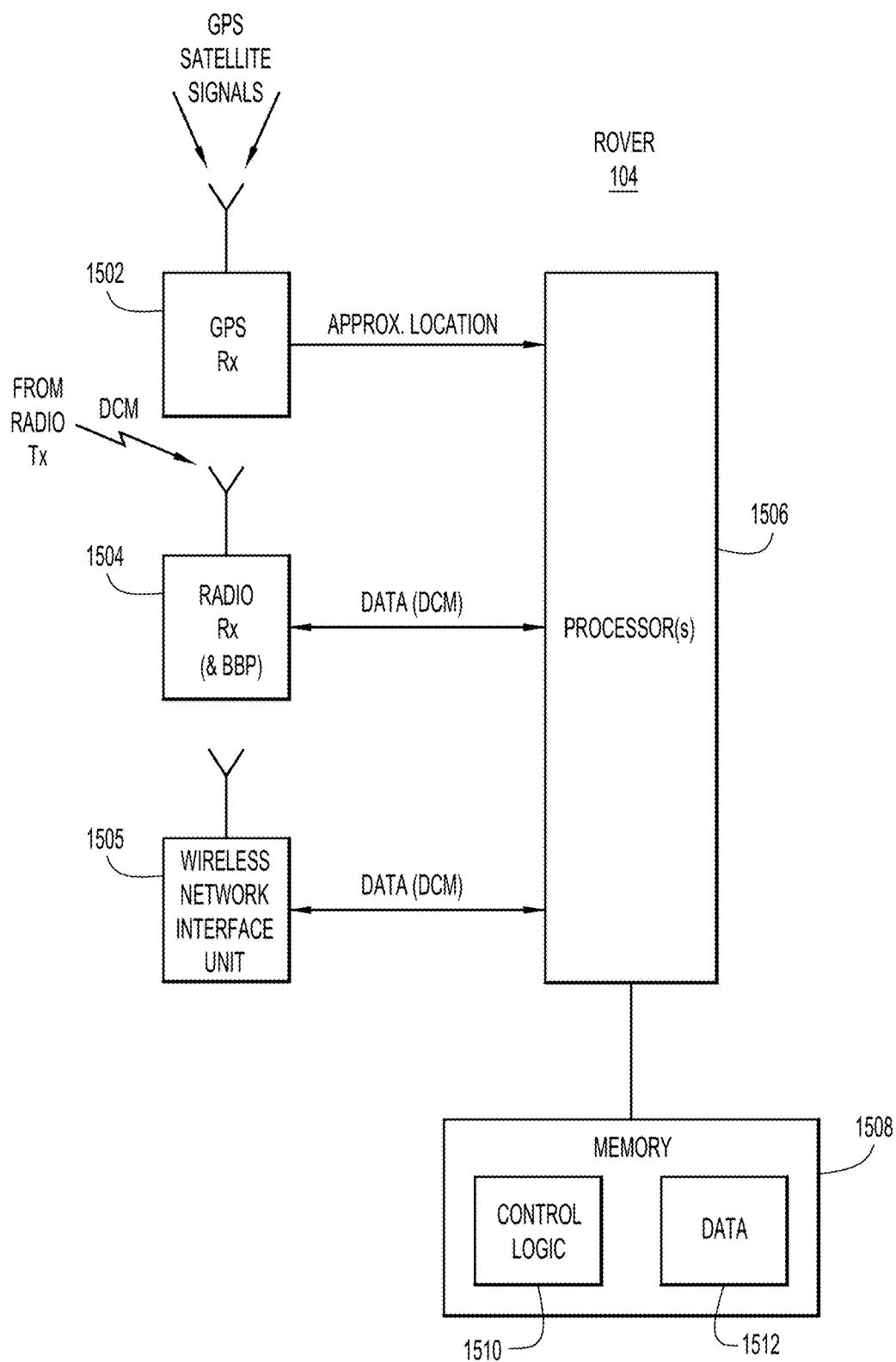
FIG. 15 is an example block diagram of a rover to receive and process the DCM.

FIG. 15 is an example block diagram of an apparatus carried by/affixed to the rover 104 for performing embodiments presented herein. Rover 104 carries/includes a GPS receiver 1502 to receive and process GPS satellite signals, a radio receiver 1504 to receive and process a radio signal transmitted by radio station(s) 304 and/or 310(1)-310(N), for example, a wireless network interface unit 1505 to establish 2-way wireless connections to a communication network, a processor 1506, and a memory 1508 all coupled to, and able to communicate with, one another. Wireless network interface unit 1505 may include a Wi-Fi interface and/or a cellular interface for transmitting and receiving wireless signals. In some embodiments, the network interface unit may also include a wired interface, such as an Ethernet card including an Ethernet port. Radio receiver 1504 and wireless network interface unit 1505 are examples of wireless receivers to receive signals wirelessly.

GPS receiver 1502 determines an approximate location of the GPS receiver based on time delays of the satellite signals measured at the GPS receiver. GPS receiver 1502 provides the approximate location and the time delays to processor 1506. In an embodiment, GPS receiver 1502 and various functions performed by processor(s) 1506 may be combined in a DGPS receiver of the rover. Radio receiver 1504 or network interface unit 1505 recovers the DCM from the radio signal or from the communication network and provides the DCM to processor 1506. Radio receiver 1504 and network interface unit 1505 may each include a baseband processor (BBP) to assist with processing, e.g., demodulating and decoding, radio signals. Alternatively, the baseband processor may be included with processor(s) 1506, or be separate from the processor(s), radio receiver, or network interface unit.

Memory 1508 stores control software 1510 (referred as "control logic"), that when executed by the processor 1506, causes the rover to perform the various operations described herein. Memory 1508 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1508 may comprise one or more tangible (non-transitory) computer readable storage media (e.g., memory device(s)) encoded with software or firmware that comprises computer executable instructions. For example, control software 1510 includes logic to implement operations performed by the rover. Thus, control software 1510 implements the various methods/operations described above, including the methods connected with FIGS. 13A-13D. Memory 1508 also stores data 1512 generated and used by control software 1510, including DCMs, DCM identifiers, approximate locations, time delays, corrected time delays, DCM-based differential corrections for the time delays, and so on.

Figure 16:
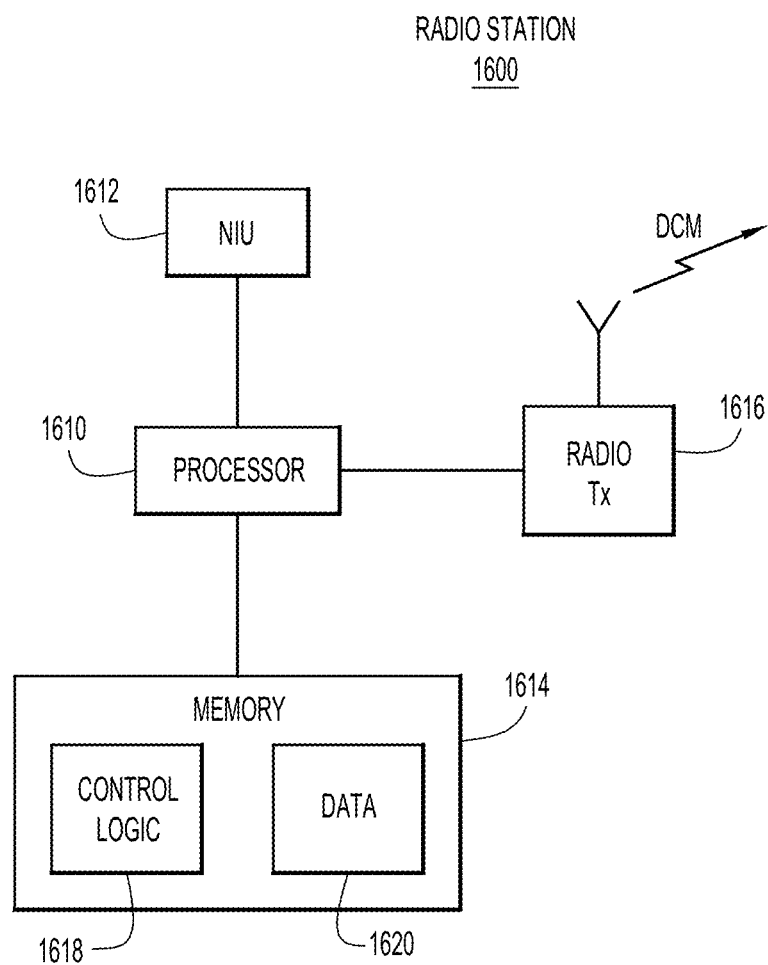
FIG. 16 is a block diagram of an example radio station to broadcast the DCM.

FIG. 16 is a block diagram of an example radio station 1600 representative of any of radio stations 304 and 310 (1)-310(N). In the example, radio station 1600 includes a processor 1610, an NIU 1612, a memory 1614, and a radio transmitter 1616 all coupled to, and thus able to communicate with, one another. Memory 1614 stores control software 1618 (referred as "control logic"), that when executed by the processor 1610, causes the processor to control the radio station 1600 to perform the various operations described herein. The processor 1610 may be a microprocessor or microcontroller (or multiple instances of such components). The NIU 1612 enables radio station 1600 to communicate over wired connections or wirelessly with a network, such as network 306. NIU 1612 may include, for example, an Ethernet card or other interface device having a connection port that enables the radio station 1600 to communicate over the network via the connection port. In a wireless embodiment, NIU 1612 includes a wireless transceiver and an antenna to transmit and receive wireless communication signals to and from the network.

The memory 1614 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1614 may comprise one or more tangible (non-transitory) computer readable storage media (e.g., memory device(s)) encoded with software or firmware that comprises computer executable instructions. For example, control software 1618 includes logic to implement operations performed by the radio station 1600, such as receiving messages conveying a DCM from the NIU 1612, and sending the DCM to radio transmitter 1616 for transmission. Memory 1614 also stores data 1620 generated and used by control software 1618, including DCMs, radio station content for transmission, and so on.

Radio transmitter 1616 receives data/information (e.g., a DCM and program content for a radio station) from processor 1610, modulates a carrier signal with the data/information, and transmits/broadcasts the modulated carrier signal as a radio signal or radio frequency across a broadcast area. Radio station 1616 may include a baseband processor (not shown) to perform baseband modulation, or the baseband processor may be integrated with processor 1610.

In some embodiments, a DGPS management entity may incorporate/combine the full functionality of both radio station 1600 and management entity 302, such that the DGPS management entity also includes a radio transmitter (e.g., radio transmitter 1616) for transmission of DCMs.

In summary, in one embodiment, a method is provided comprising: generating for a Global Navigation Satellite System (GNSS) a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations.

In another embodiment, a method is provided comprising: determining a virtual reference station constellation (VRSC) of virtual reference stations having respective locations spanning a geographical area; generating for a Global Navigation Satellite System (GNSS) a differential correction map (DCM) based on the VRSC, the DCM representing a non-planar surface of differential corrections that varies across a geographical area represented by the DCM; and transmitting a radio signal that conveys the DCM across the geographical area.

In yet another embodiment, an apparatus is provided comprising: memory; and a processor coupled to the memory and configured to: generate for a Global Navigation Satellite System (GNSS) a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations.

In a further embodiment, a non-transitory computer readable medium is provided. The computer readable medium is encoded with instructions that, when executed by a processor, cause the processor to generate for a Global Navigation Satellite System (GNSS) a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations In another embodiment, a method is provided comprising: receiving an approximate location of a rover platform based on satellite signals for a Global Navigation Satellite System (GNSS); receiving for the GNSS a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations; deriving DCM-based differential corrections for the satellite signals at the approximate location based on the DCM; correcting the satellite signals using the DCM-based differential corrections; and determining a location of the rover platform using the corrected satellite signals.

In yet another embodiment, an apparatus is provided comprising: memory; and a processor coupled to the memory and configured to: receive an approximate location of a rover platform that is based on satellite signals for a Global Navigation Satellite System (GNSS); receive for the GNSS a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations; derive DCM-based differential corrections for the satellite signals at the approximate location based on the DCM; correct the satellite signals using the DCM-based differential corrections; and determine a location of the rover platform using the corrected satellite signals.

In an even further embodiment, a non-transitory computer readable medium encoded with instructions is provided. The instructions, when executed by a processor, cause the processor to: receive an approximate location of a rover platform that is based on satellite signals for a Global Navigation Satellite System (GNSS); receive for the GNSS a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations, the DCM including a DCM identifier (ID), GNSS time, the locations of one or more of the reference stations, and differential corrections for each reference station; interpolate the DCM at the approximate location to produce interpolated differential corrections for the satellite signals; correct the satellite signals using the interpolated differential corrections; and determine a location of the rover platform using the corrected satellite signals.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:
accessing aggregated differential correction information from a database; and
generating, from the aggregated differential correction information, for a Global Navigation Satellite System (GNSS) a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations.

2. The method of claim 1, wherein the reference station constellation includes a virtual reference station constellation (VRSC) including virtual reference stations approximately uniformly spaced across the geographical area represented by the DCM.

3. The method of claim 2, further comprising:
selecting the VRSC from a set of predetermined VRSCs, wherein the generating includes generating the DCM for the selected predetermined VRSC.

4. The method of claim 3, wherein the DCM includes:
GNSS time; and
a location of only one of the reference stations;
an identifier of the VRSC;
an identifier of each GNSS satellite in view of the geographical area represented by the DCM; and
the differential correction for each reference station for each frequency of each GNSS satellite in view.

5. The method of claim 1, wherein the reference stations are non-uniformly spaced across the geographical area represented by the DCM.

6. The method of claim 1, wherein the DCM includes an identifier of the DCM, GNSS time, the locations of one or more of the reference stations, and differential corrections for each reference station.

7. The method of claim 1, wherein the DCM includes:
GNSS time;
locations of the reference stations;
an identifier of each GNSS satellite in view of the geographical area represented by the DCM; and
the differential correction for each reference station for each frequency of each GNSS satellite in view.

8. The method of claim 7, wherein the DCM further includes a drift rate of the differential correction for each reference station for each frequency of each GNSS satellite in view.

9. The method of claim 1, wherein the DCM includes an identifier of the DCM, GNSS time, the locations of one or more of the reference stations, and polynomial coefficients of a polynomial fit for the differential corrections for the reference stations.

10. The method of claim 1, wherein the generating includes generating the DCM from a two-dimensional polynomial surface fit to the differential correction associated with each frequency and each GNSS satellite in view of the geographical area represented by the DCM.

11. The method of claim 10, wherein the DCM includes:
GNSS time;
an origin of the two-dimensional polynomial surface;
an identifier of each of the GNSS satellites in view of the geographical area represented by the DCM; and
polynomial coefficients associated with the two-dimensional polynomial surface.

12. The method of claim 11, wherein the DCM further includes a drift rate of each polynomial coefficient for each frequency of each GNSS satellite in view.

13. The method of claim 1, further comprising transmitting the DCM over a broadcast coverage area via a radio signal.

14. The method of claim 1, further comprising storing the DCM in a computer database accessible over a communication network.

15. The method of claim 1, further comprising:
generating multiple DCMs based on multiple reference station constellations, and alternately transmitting the multiple DCMs.

16. The method of claim 1, further comprising:
encrypting the DCM; and
transmitting the encrypted DCM via broadcast radio signal or over a communication network.

17. A method comprising:
determining a virtual reference station constellation (VRSC) of virtual reference stations having respective locations spanning a geographical area;
accessing aggregated differential correction information from a database;
generating, from the aggregated differential correction information, for a Global Navigation Satellite System (GNSS) a differential correction map (DCM) based on the VRSC, the DCM representing a non-planar surface of differential corrections that varies across a geographical area represented by the DCM; and
transmitting a radio signal that conveys the DCM across the geographical area.

18. The method of claim 17, wherein the VRSC includes four or more of the virtual reference stations.

19. The method of claim 18, wherein the virtual reference stations are approximately uniformly spaced across the geographical area represented by the DCM.

20. The method of claim 18, wherein the virtual reference stations are non-uniformly spaced across the geographical area represented by the DCM.

21. An apparatus comprising:
memory; and
a processor coupled to the memory and configured to:
access aggregated differential correction information from a database; and
generate, from the aggregated differential correction information, for a Global Navigation Satellite System (GNSS) a differential correction map (DCM) representing a non-planar surface of differential corrections that varies across a geographical area represented by the DCM, the differential corrections being based on a reference station constellation of GNSS reference stations having respective locations spanning the geographical area, the GNSS reference stations including physical or virtual reference stations.

22. The apparatus of claim 21, wherein the reference station constellation includes a virtual reference station constellation (VRSC) including virtual reference stations approximately uniformly spaced across the geographical area represented by the DCM.

23. The apparatus of claim 22, wherein the processor is further configured to:
select the VRSC from a set of predetermined VRSCs,
wherein the processor is configured to generate by generating the DCM for the selected predetermined VRSC.

24. The apparatus of claim 23, wherein the DCM includes:
GNSS time; and
a location of only one of the reference stations;
an identifier of the VRSC;
an identifier of each GNSS satellite in view of the geographical area represented by the DCM; and
the differential correction for each reference station for each frequency of each GNSS satellite in view.

25. The apparatus of claim 21, wherein the reference stations are non-uniformly spaced across the geographical area represented by the DCM.

26. The apparatus of claim 21, wherein the DCM includes:
GNSS time;
locations of the reference stations;
an identifier of each GNSS satellite in view within the geographical area represented by the DCM; and
the differential correction for each reference station for each frequency of each GNSS satellite in view.

27. The apparatus of claim 21, wherein the processor is configured to generate by generating the DCM from a two-dimensional polynomial surface fit to the differential correction associated with each frequency and each GNSS satellite in view of the geographical area represented by the DCM.

28. The apparatus of claim 27, wherein the DCM includes:
GNSS time;
an origin of the two-dimensional polynomial surface;
an identifier of each of the GNSS satellites in view of the geographical area represented by the DCM; and
polynomial coefficients associated with the two-dimensional polynomial surface.

29. The apparatus of claim 21, wherein the processor is further configured to provide the DCM to a transmitter configured to transmit the DCM over a broadcast coverage area via a radio signal.

30. The apparatus of claim 21, further comprising a network interface unit coupled to the memory and the processor and configured to communicate with a communication network, such that the DCM is accessible over the communication network.

31. The apparatus of claim 21, further comprising:
a transmitter, wherein the processor is further configured to generate multiple DCMs based on multiple reference station constellations, and the transmitter is configured to alternately transmit the multiple DCMs.

* * * * *